US011879455B2

(12) United States Patent
Hijima et al.

(10) Patent No.: US 11,879,455 B2
(45) Date of Patent: Jan. 23, 2024

(54) SUPPLY PUMP

(71) Applicant: DENSO CORPORATION, Kariya (JP)

(72) Inventors: Toshiaki Hijima, Nisshin (JP); Bansei Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/864,673

(22) Filed: Jul. 14, 2022

(65) Prior Publication Data

US 2023/0018875 A1 Jan. 19, 2023

(30) Foreign Application Priority Data

Jul. 16, 2021 (JP) ................................ 2021-118160

(51) Int. Cl.
*F04B 9/04* (2006.01)
*F04B 1/0413* (2020.01)
*F02M 59/10* (2006.01)

(52) U.S. Cl.
CPC ............ *F04B 9/042* (2013.01); *F04B 1/0413* (2013.01); *F04B 9/045* (2013.01); *F02M 59/102* (2013.01)

(58) Field of Classification Search
CPC ... F02M 59/102; F04B 1/0413; F04B 1/0426; F04B 9/042; F04B 9/045; F04B 17/05
USPC ................ 417/470; 92/129; 74/25; 123/508
See application file for complete search history.

(56) References Cited

U.S. PATENT DOCUMENTS 6,205,980 B1 * 3/2001 Spinnler .............. F02M 59/102 123/495
6,350,107 B1 * 2/2002 Hamutcu .............. F04B 1/0426 92/72
6,722,864 B2 * 4/2004 Suzuki .................. F16C 23/041 123/456
8,181,564 B2 * 5/2012 Rosu ..................... F04B 1/0426 92/72

FOREIGN PATENT DOCUMENTS

DE 4107952 A1 9/1991
DE 10348140 A1 5/2005
DE 60309145 T2 8/2007
DE 102006045897 B4 4/2008
EP 1058001 A1 12/2000
JP 2009-138596 6/2009
JP 2009138596 A * 6/2009
RU 202059 U1 1/2021

* cited by examiner

*Primary Examiner* — Devon C Kramer
*Assistant Examiner* — Joseph S. Herrmann
(74) *Attorney, Agent, or Firm* — Nixon & Vanderhye P.C.

(57) ABSTRACT

A cam ring of a supply pump revolves around a camshaft without rotating. A tappet reciprocates in a direction perpendicular to the camshaft in response to revolution of the cam ring such that the tappet slides along a cam ring sliding surface. A plunger reciprocates together with the tappet to pressurize and deliver fuel. The cam ring sliding surface is shaped in a convex form that has a curved contour line which is non-circular. A height of an inside of the cam ring sliding surface is higher than a height of a periphery of the cam ring sliding surface. Specifically, an ellipsoidal surface portion is formed at the cam ring sliding surface, and an axial direction of a major axis of the ellipsoidal surface portion is set to coincide with a direction perpendicular to a sliding direction of the cam ring sliding surface.

4 Claims, 19 Drawing Sheets

COMPARATIVE EXAMPLE

COMPARATIVE EXAMPLE

COMPARATIVE EXAMPLE

COMPARATIVE EXAMPLE

COMPARATIVE EXAMPLE

SUPPLY PUMP

CROSS REFERENCE TO RELATED APPLICATION

This application is based on and incorporates herein by reference Japanese Patent Application No. 2021-118160 filed on Jul. 16, 2021.

TECHNICAL FIELD

The present disclosure relates to a supply pump.

BACKGROUND

In a previously proposed supply pump, fluid is pressurized and delivered by reciprocating a tappet and a plunger in response to revolution of a cam ring.

In order to limit seizure of a sliding portion between the tappet and the cam ring, a tappet sliding surface of the tappet may be provided with a recess that is not in contact with a cam ring sliding surface of the cam ring, so that a contact surface pressure of the tappet sliding surface is dispersed to achieve a uniform contact surface pressure.

SUMMARY

This section provides a general summary of the disclosure, and is not a comprehensive disclosure of its full scope or all of its features.

According to the present disclosure, there is provided a supply pump that includes:

- a camshaft that is configured to be rotated;
- a cam that is eccentric to the camshaft and is configured to rotate integrally with the camshaft;
- a cam ring that is configured to revolve around the camshaft without rotating while the cam ring slides along an outer periphery of the cam;
- a tappet that is configured to reciprocate in a direction perpendicular to the camshaft in response to revolution of the cam ring such that the tappet slides along a cam ring sliding surface which is an outer peripheral surface of the cam ring that extends in a direction parallel with the camshaft; and
- a plunger that is configured to reciprocate together with the tappet to pressurize and deliver fluid.

The tappet has a tappet recess formed at a tappet sliding surface which is opposed to the cam ring sliding surface.

The cam ring sliding surface may be shaped in a convex form while a contour line of the convex form is a closed curve that is other than a circle, and a height of an inside of the cam ring sliding surface is higher than a height of a periphery of the cam ring sliding surface.

Alternatively or additionally, the tappet may have a resiliently deformable portion that enables resilient deformation of the tappet such that a contact surface area between the tappet sliding surface and the cam ring sliding surface is increased when a load is applied to the tappet toward the cam ring.

Further alternatively or additionally, the cam ring may have a stress relaxation groove formed at a cam ring non-sliding surface which extends in the direction parallel with the camshaft and is perpendicular to the cam ring sliding surface.

Further alternatively or additionally, the cam ring may have a cooling recess that is formed in at least one of two opposite end portions of the cam ring sliding surface which are opposite to each other in a sliding direction of the cam ring sliding surface.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
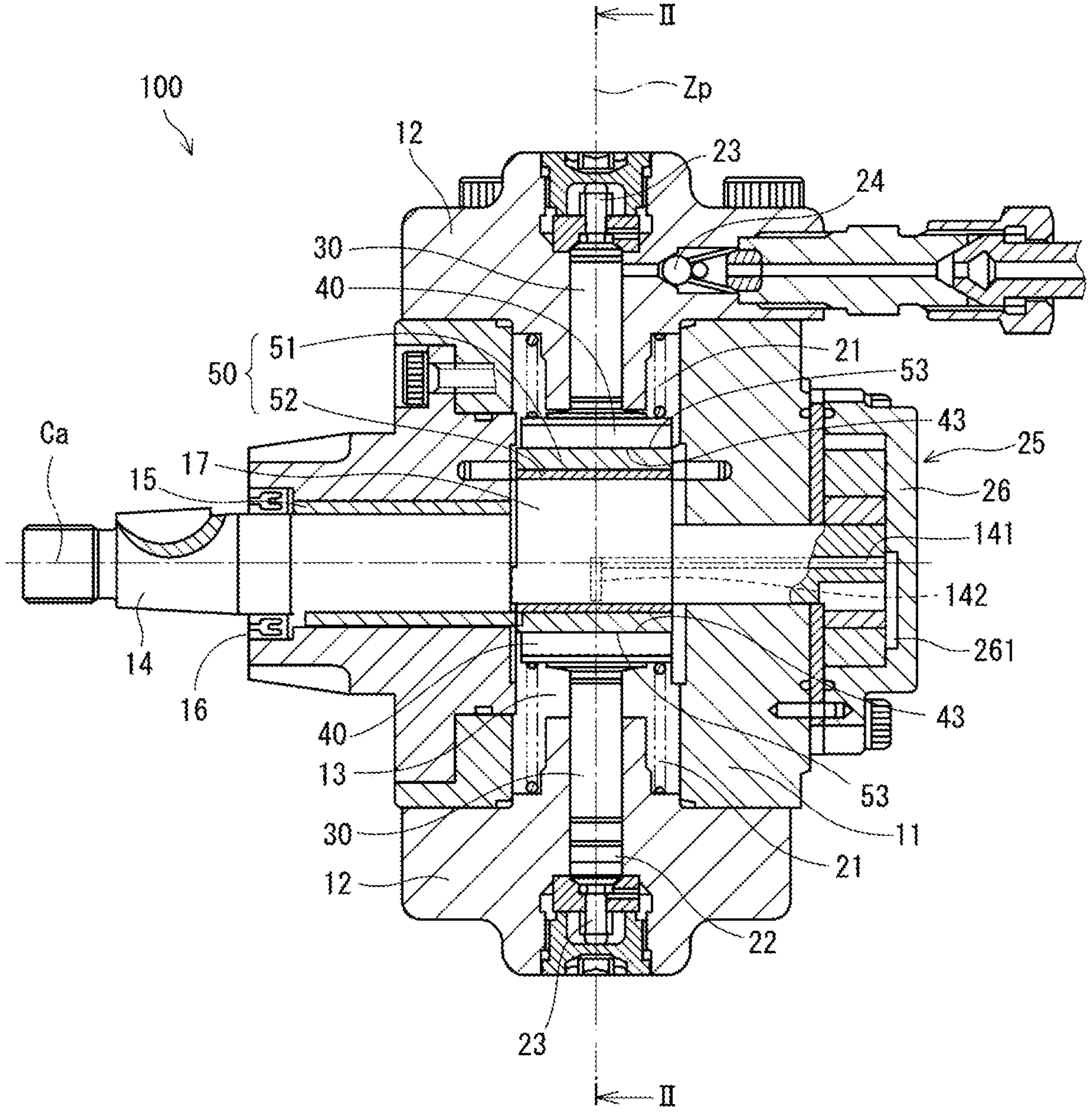
FIG. 1 is a cross-sectional view of a supply pump which is common to embodiments of the present disclosure.

In a previously proposed supply pump, fluid is pressurized and delivered by reciprocating a tappet and a plunger in response to revolution of a cam ring.

In order to limit seizure of a sliding portion between the tappet and the cam ring, a tappet sliding surface of the tappet may be provided with a recess that is not in contact with a cam ring sliding surface of the cam ring, so that a contact surface pressure of the tappet sliding surface is dispersed to achieve a uniform contact surface pressure.

In general, the supply pump pumps fuel as the fluid to an internal combustion engine. In recent years, there has been an increasing need to increase an injection pressure of the fuel injected in the internal combustion engine in order to reduce fuel consumption and comply with exhaust regulations. In addition, robustness with respect to fuel properties is required in cold regions and emerging countries, and a further improvement in the seizure resistance is an issue in particular.

The present disclosure includes a supply pump of first to fourth aspects. Common to all of these four aspects, the supply pump includes a camshaft, a cam, a cam ring, a tappet and a plunger. The cam is eccentric to the camshaft and is configured to rotate integrally with the camshaft. The cam ring is configured to revolve around the camshaft without rotating while the cam ring slides along an outer periphery of the cam.

The tappet is configured to reciprocate in a direction perpendicular to the camshaft in response to revolution of the cam ring such that the tappet slides along a cam ring sliding surface which is an outer peripheral surface of the cam ring that extends in a direction parallel with the camshaft. The plunger is configured to reciprocate together with the tappet to pressurize and deliver fluid. The tappet has a tappet recess formed at a tappet sliding surface which is opposed to the cam ring sliding surface, and the tappet recess is out of contact with the cam ring sliding surface.

In the supply pump of the first aspect, the cam ring sliding surface is shaped in a convex form while a contour line of the convex form is a closed curve that is other than a circle, and a height of an inside of the cam ring sliding surface is higher than a height of a periphery of the cam ring sliding surface. Here, it should be noted that the contour line is also referred to as an isoline and is a line of constant height, i.e., a line joining points of equal height (or elevation) of the convex form.

Preferably, an ellipsoidal surface portion is formed at the cam ring sliding surface such that an axial direction of a major axis of the ellipsoidal surface portion is set to coincide with one of a sliding direction of the cam ring sliding surface and a direction perpendicular to the sliding direction, and an axial direction of a minor axis of the ellipsoidal surface portion is set to coincide with another one of the sliding direction and the direction perpendicular to the sliding direction.

When a working pressure of the supply pump is increased, an urging force of the tappet against the cam ring sliding surface is increased to cause an increase in a contact surface pressure between the tappet and the cam ring sliding surface. Thus, a risk of the seizure between the tappet and the cam ring sliding surface increases. Therefore, in the first aspect of the present disclosure, the contour line of the convex form of the cam ring sliding surface is set to be the closed curve, such as an ellipse, which is other than the circle, and thereby the concentration of the contact surface pressure at a center portion of the cam ring sliding surface is avoided, and the contact surface pressure is spread over the wide range. In this way, the maximum contact surface pressure can be reduced, and the seizure resistance can be improved.

Furthermore, it is preferable that an apex of the ellipsoidal surface portion is eccentrically displaced from the center of the cam ring sliding surface. In the structure where the plunger axis, which is the sliding center of the tappet, is eccentrically displaced from the center of the camshaft, by eccentrically displacing the apex of the ellipsoidal surface portion from the center of the cam ring sliding surface, it is effective in terms of both the oil film formability and the contact surface pressure dispersion.

In the supply pump of the second aspect, the tappet has a resiliently deformable portion that enables resilient deformation of the tappet such that a contact surface area between the tappet sliding surface and the cam ring sliding surface is increased when a load is applied to the tappet toward the cam ring. For example, the tappet has an annular groove which serves as the resiliently deformable portion and is formed at a tappet upper surface, which is a surface of the tappet opposite to the tappet sliding surface.

By providing the resiliently deformable portion at the tappet, it is possible to obtain the advantage of dispersing the contact surface pressure at the time of applying the load to the tappet. In the case where a depth of the tappet recess is set small, it is difficult to obtain the processing accuracy. According to the second aspect of the present disclosure, even when the depth of the tappet recess is set large, the deformation of the tappet can be absorbed. Thus, the processability is improved.

In the supply pump of the third aspect, the cam ring has a stress relaxation groove formed at a cam ring non-sliding surface of the cam ring. The cam ring non-sliding surface extends in the direction parallel with the camshaft and is perpendicular to the cam ring sliding surface. The stress relaxation groove extends in a direction that crosses an axial direction of the plunger, and the stress relaxation groove is configured to relax transmission of a stress applied in the axial direction of the plunger.

When the direction of the reciprocating motion of the tappet is reversed, the contact surface pressure of an edge portion of the cam ring sliding surface is increased, and thereby the edge portion tends to be deformed and bulged. In view of the above point, according to the third aspect of the present disclosure, the stress relaxation groove is formed at the cam ring non-sliding surface. Therefore, it is possible to disperse the stress, which is generated by the contact surface pressure, by allowing the deformation of the edge portion upon application of the load to the edge portion. Furthermore, in a case of a cam ring that is used in a two-cylinder pump and has a relatively small lift amount, at the time of press-fitting a bush into the cam ring, there is a concern that the non-sliding surface is bulged, and the sliding surface is recessed. Therefore, particularly, there is a concern that the contact surface pressure is increased at the time when the tappet passes over the edge portion. Thus, the effect of the third aspect of the present disclosure is advantageous.

In the supply pump of the fourth aspect, the cam ring has a cooling recess that is formed in at least one of two opposite end portions of the cam ring sliding surface which are opposite to each other in the sliding direction of the cam ring sliding surface. The cooling recess is configured to receive the fluid and cool the cam ring sliding surface.

As one of seizure mechanisms between the cam ring and the tappet, there is a mode in which heat is trapped and stored in the cam ring sliding surface, so that the temperature rises to near the melting point of the base material, and the seizure occurs. With respect to this, in the existing technique, by eccentrically displacing the sliding center (the plunger axis) of the tappet and the center of the cam shaft relative to each other, the tappet is overlapped from the cam ring sliding surface, and thereby the fluid having the low temperature is supplied to the inside of the sliding surface. According to the fourth aspect of the present disclosure, the fluid supply to the inside of the sliding surface can be promoted, and thereby the temperature increase can be limited. Thus, the seizure resistance is improved.

Preferably, the cooling recess is formed on one side of the center of the cam ring sliding surface centered in the sliding direction while the one side is a side, toward which the tappet slides during the time of moving the plunger toward the camshaft, i.e., during a non-delivery time. In contrast, the cooling recess is not formed on the other side of the center of the cam ring sliding surface centered in the sliding direction while the other side is a side, toward which the tappet slides during the time of moving the plunger away from the camshaft, i.e., during a delivery time. Therefore, it is possible to limit the deterioration in the oil film formability in the range where the high load is applied during the delivery time.

Hereinafter, a plurality of embodiments of a supply pump according to the present disclosure will be described with reference to the drawings. In the embodiments, substantially the same structures are indicated by the same reference signs, and redundant description thereof will be omitted. The following embodiments are classified into four groups A to D, which have different solutions to a common objective of "improving the seizure resistance". Each group contains one to three embodiments. The embodiment(s) of each group may be collectively referred to as "the present embodiment".

(Supply Pump)

First of all, with reference to FIGS. 1 and 2, an overall structure of a supply pump common to each group will be described. A reference sign 50 is used as a reference sign of the cam ring in each of the embodiments. The supply pump is used in an accumulator fuel injection system for a diesel engine to supply high pressure fuel to a common rail.

A housing of a supply pump 100 includes a housing main body 11 and a pair of cylinder heads 12. A cam chamber 13, to which the fuel is supplied from a feed pump, is formed in the housing main body 11. Two opposite ends of the cam chamber 13 are respectively closed by the cylinder heads 12. A cam 17 and the cam ring 50 are received in the cam chamber 13.

A camshaft 14 is rotatably supported by the housing main body 11 through a journal 15 and is rotated by the diesel engine (not shown). An oil seal 16 seals between the camshaft 14 and the housing main body 11. The cam 17, which has a circular cross-section, is located at an axial intermediate portion of the camshaft 14 such that the cam 17 is eccentric to the camshaft 14 and is rotated integrally with the camshaft 14. In FIG. 2, a rotational direction of the cam 17 is indicated by an arcuate arrow. Furthermore, a center of the camshaft 14 is indicated as a camshaft center Ca.

The cam ring 50, which revolves around the camshaft 14, is fitted to an outer periphery of the cam 17. The cam ring 50 includes a cam ring main body 51 and a bush 52. The cam ring main body 51 is made of iron-based metal. The bush 52 is shaped in a cylindrical tubular form and is made of metal (e.g., copper, aluminum, iron-based metal) or resin. An outside contour of the cam ring main body 51 is shaped in a quadrangular prism form, and a circular through-hole extends through the cam ring main body 51. The bush 52 is press-fitted into the through-hole of the cam ring main body 51 and is slidable along the outer periphery of the cam 17. Each of upper and lower outer surfaces of the cam ring 50 shown in FIGS. 1 and 2 forms a cam ring sliding surface 53 that extends in the direction parallel with the camshaft 14. Furthermore, each of left and right outer surfaces of the cam ring 50 shown in FIG. 2 extends in the direction parallel with the camshaft 14 and forms a cam ring non-sliding surface 54 that is perpendicular to the cam ring sliding surfaces 53.

Figure 2:
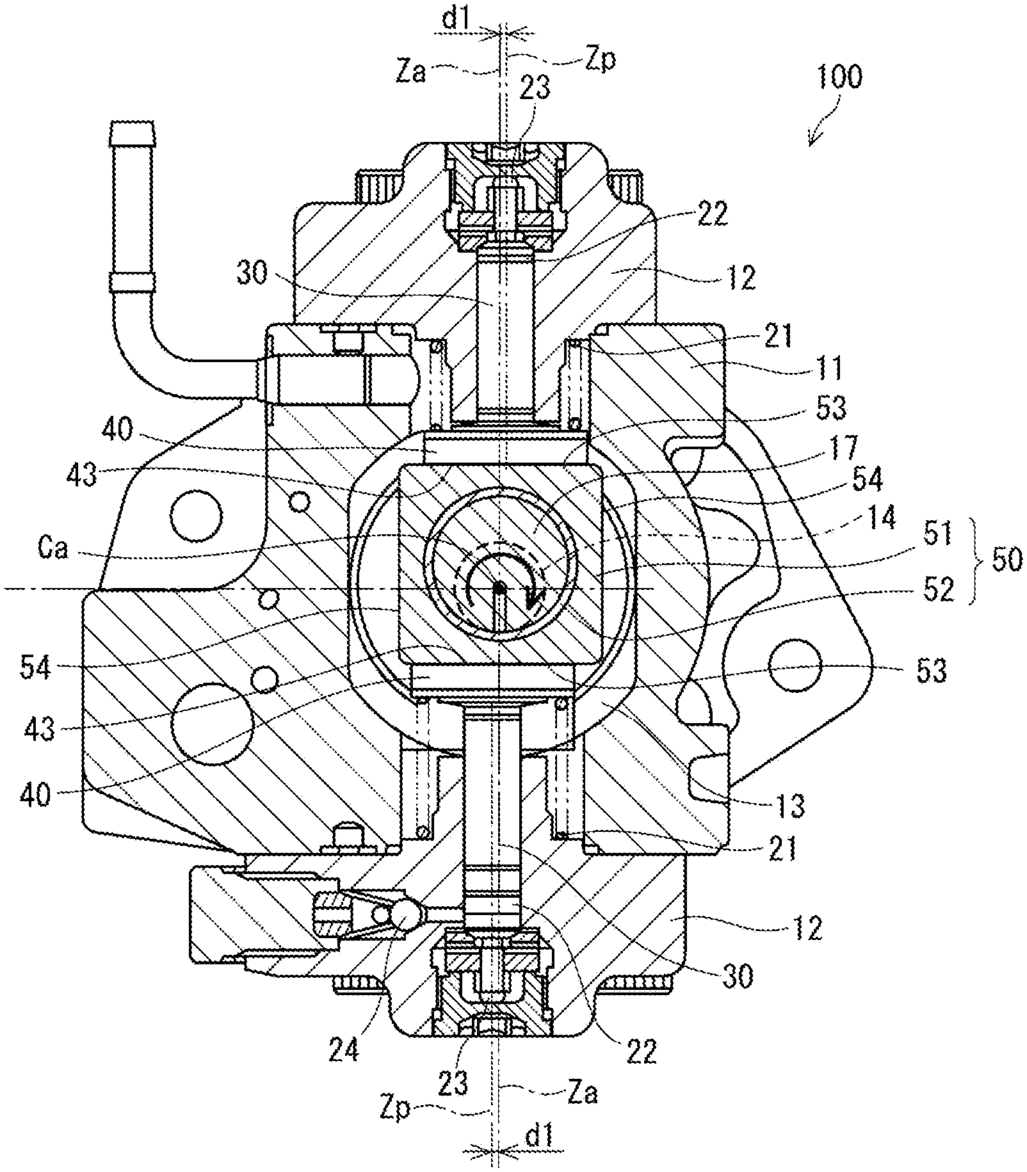
FIG. 2 is a cross-sectional view taken along line II-II in FIG. 1.
Figure 3A:
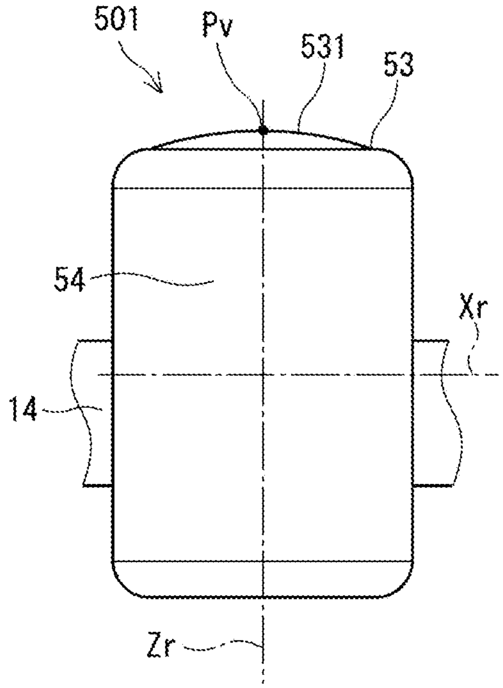
FIG. 3A is a left side view of a cam ring of a first embodiment of a group A.
Figure 3B:
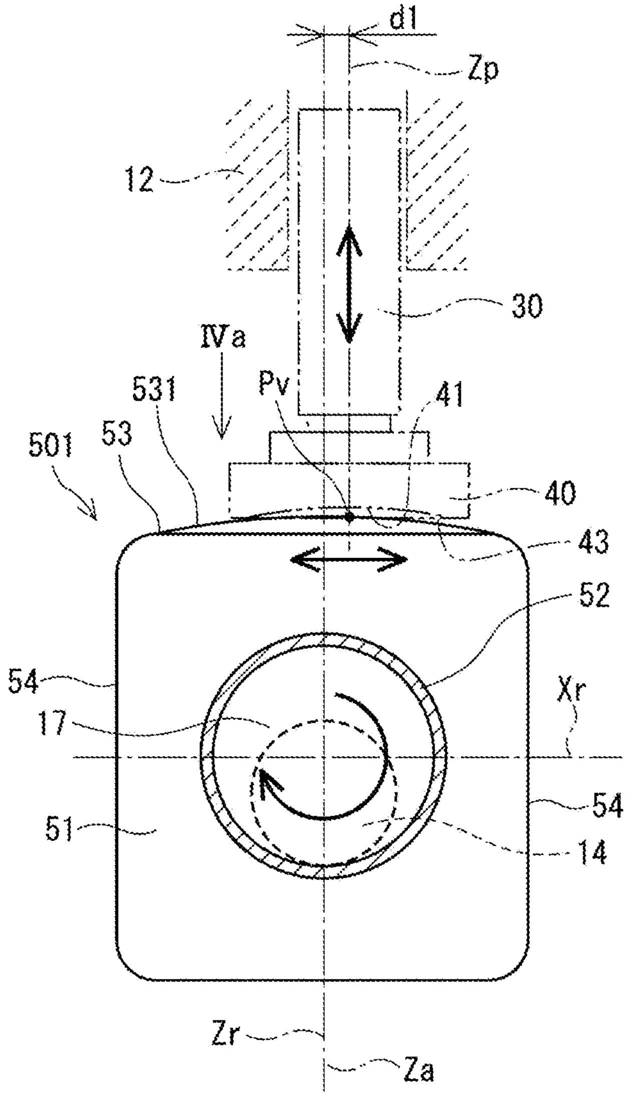
FIG. 3B is a front view of the cam ring shown in FIG. 3A.

A set of a plunger 30 and a tappet 40 made of iron-based metal is provided at each of the upper side and the lower side of the cam ring 50 in FIGS. 1 and 2. Each plunger 30 is inserted into a cylinder formed in the corresponding cylinder head 12 and is configured to reciprocate in the cylinder. Each tappet 40, which is shaped in a circular disk form, is received in the cam chamber 13 and is positioned such that a tappet sliding surface 43 of the tappet 40 is opposed to the corresponding cam ring sliding surface 53. As shown in FIGS. 3, 9, 13 and 17, the tappet 40 of the embodiment of each group has a tappet recess 41 which is formed at the tappet sliding surface 43 and is out of contact with the cam ring sliding surface 53.

The tappet 40 is urged against the cam ring 50 by a corresponding spring 21 installed in the cam chamber 13, so that rotation of the cam ring 50 is limited. When the cam 17 is rotated, the cam ring 50 revolves around the camshaft 14 without rotating while the cam ring 50 slides along the outer periphery of the cam 17. When the tappet sliding surface 43 of the tappet 40 is slid along the cam ring sliding surface 53, the tappet 40 and the plunger 30 are reciprocated in a direction perpendicular to the camshaft 14 in response to the revolution of the cam ring 50.

The plunger 30 and the tappet 40 are coaxially arranged. An axis of the plunger 30 and the tappet 40 will be referred to as a plunger axis Zp. Furthermore, in a cross-section shown in FIG. 2, a straight line, which extends through the camshaft center Ca and is parallel to each plunger axis Zp, will be referred to as a central reference line Za. The cam ring 50 is moved left and right relative to the central reference line Za in response to the rotation of the camshaft 14. In the present embodiment, the plunger axis Zp located at the upper side of FIG. 2 is eccentrically displaced from the central reference line Za toward the right side, and the other plunger axis Zp located at the lower side of FIG. 2 is eccentrically displaced from the central reference line Za toward the left side. That is, the plunger axis Zp located at the upper side of FIG. 2 and the other plunger axis Zp located at the lower side of FIG. 2 are eccentrically displaced from the central reference line Za toward the forward side in the rotational direction of the camshaft 14. The amount of eccentricity of each plunger axis Zp relative to the central reference line Za is indicated by d1.

At the inside of each cylinder head 12, a fuel pressurizing chamber 22, to which the fuel is supplied from the feed pump 25, is formed on a side of the plunger 30 which is opposite to the tappet 40. Furthermore, an inlet check valve 23 and an outlet check valve 24 are installed at the inside of each cylinder head 12. The inlet check valve 23 enables only a flow of the fuel from the feed pump 25 toward the fuel pressurizing chamber 22. The outlet check valve 24 enables only a flow of the fuel from the fuel pressurizing chamber 22 toward the common rail (not shown).

One end of the camshaft 14 is coupled to the feed pump 25 that is of an inner gear type. The feed pump 25 is rotatably received at an inside of a pump cover 26. When the camshaft 14 is rotated, the feed pump 25 pressurizes the fuel suctioned from the fuel tank and discharge the pressurized fuel. The fuel, which is discharged from the feed pump 25, is supplied to the fuel pressurizing chamber 22 through a fuel passage (not shown) and the inlet check valve 23. A metering valve, which is installed in the middle of the fuel passage, adjusts the amount of the fuel supplied to the fuel pressurizing chamber 22 based on an operational state of the engine.

A communication passage 261, which is formed at the pump cover 26, guides the fuel, which is discharged from the feed pump 25, to one end surface of the camshaft 14. An axial lubricant oil passage 141 and a radial lubricant oil passage 142 are formed in the camshaft 14. The axial lubricant oil passage 141 opens at the one end surface of the camshaft 14 and is communicated with the communication passage 261. The radial lubricant oil passage 142 communicates between the axial lubricant oil passage 141 and an outer peripheral surface of the cam 17. A portion of the fuel, which is discharged from the feed pump 25, is supplied to the cam chamber 13 through these paths.

Next, the operation of the supply pump 100 will be described. When the camshaft 14 is rotated, the feed pump 25 suctions the fuel from the fuel tank and pressurizes and discharges the suctioned fuel. Furthermore, the cam 17 is rotated in response to the rotation of the camshaft 14, and the cam ring 50 revolves without rotating in response to the rotation of the cam 17. Each tappet 40 and the corresponding plunger 30 are reciprocated in response to the revolution of the cam ring 50.

When the plunger 30, which is placed at a top dead center, is moved toward a bottom dead center, the fuel, which is discharged from the feed pump 25, flows into the fuel pressurizing chamber 22 through the inlet check valve 23. When the plunger 30, which has reached the bottom dead center, is moved toward the top dead center once again, the inlet check valve 23 is closed. Thereby, the fuel pressure in the fuel pressurizing chamber 22 is increased. When the fuel pressure in the fuel pressurizing chamber 22 is increased, the outlet check valve 24 is opened. Thereby, the high pressure fuel is supplied to the common rail. As described above, the plunger 30 is reciprocated together with the tappet 40 to pressurize and deliver the fuel.

In contrast, a portion of the fuel, which is discharged from the feed pump 25, is guided to a gap between the cam 17 and the bush 52 of the cam ring 50 through the communication passage 261, the axial lubricant oil passage 141 and the radial lubricant oil passage 142 and then flows into the cam chamber 13. In this way, a sliding portion between the cam 17 and the bush 52 is lubricated, and the cam ring sliding surface 53 and the tappet sliding surface 43 are lubricated.

Next, detailed structures and actions of the cam ring 50 and the tappet 40 in the supply pump 100 of the embodiment (s) of each group will be sequentially described. In the drawings of the following embodiments, only the tappet 40 and the plunger 30 shown on the upper side of FIGS. 1 and 2 are indicated, and the tappet 40 and the plunger 30 shown on the lower side of FIGS. 1 and 2 are omitted. A reference sign of the cam ring of each embodiment of each of the group A, the group C and the group D has a third digit, which corresponds to the embodiment, after "50". A reference sign of the tappet of the embodiment of the group B is set to be "404".

Hereinafter, an external view of the cam ring 50 viewed from the viewing direction of FIG. 2 is referred to as a front view, and the external view of the cam ring 50 viewed from the viewing direction of FIG. 1 is referred to as a left side view. Also, a view of the cam ring sliding surface 53 viewed from the plunger 30 side is referred to as a plan view. Furthermore, a left-to-right direction in the plan view and the front view is defined as an X direction. An up-to-down direction in the plan view is defined as a Y direction, and an up-to-down direction in the front view is defined as a Z direction. A center line extending in the X direction through the center of the cam ring 50 shaped in a substantially rectangular parallelepiped form is indicated by Xr. A center line extending in the Y direction through the center of the cam ring 50 is indicated by Yr, and a center line extending in the Z direction through the center of the cam ring 50 is indicated by Zr.

In the front view shown in each of FIGS. 3B, 7B, 13B, and 17B, the cam ring 50 is indicated by a solid line, and the tappet 40, the plunger 30 and the cylinder head 12 are indicated by an imaginary line (a dot-dot-dash line). The cam ring sliding surface 53 is opposed to the tappet sliding surface 43 and is slid in response to the rotation of the camshaft 14. Depending on the rotational position of the camshaft 14, the Z direction center line Zr of the cam ring 50 may coincide with the central reference line Za and may be displaced from the central reference line Za. Each of the front views shows the state in which the Z direction center line Zr of the cam ring 50 coincides with the central reference line Za.

Group A

The supply pump of the group A will be described with reference to FIGS. 3A to 8. In the supply pump of the group A, the cam ring sliding surface 53 is shaped in a convex form such that a height of an inside of the cam ring sliding surface 53 is higher than a height of a periphery of the cam ring sliding surface 53. Each of contour lines of the convex form is a closed curve that is other than a circle (see the contour lines shown in, for example, FIG. 4A). Here, the closed curve, which is other than the circle, includes a closed curve in an oblong shape, a closed curve in an oval shape, a closed curve in a gourd shape or the like in addition to a closed curve in an ellipse shape. In the plan view of each embodiment of the group A, the convex form of the cam ring sliding surface 53 are expressed by the contour lines. A height of the convex form is actually a minute height on an order of μm. However, in FIGS. 3A, 3B and 7B, the height is exaggerated. Further, illustration and description of the convex form on the cam ring sliding surface 53 at the lower side of the drawing is omitted.

First Embodiment of Group A

The cam ring 501 of the first embodiment will be described with reference to FIGS. 3A to 4B. In the front view of FIG. 3B, the arcuate arrow indicates the rotation of the camshaft 14, and a double-sided arrow in the left-to-right direction indicates the slide of the cam ring 501. Also, a double-sided arrow in the up-to-down direction indicates the reciprocation of the plunger 30. The X direction corresponds to the sliding direction of the cam ring sliding surface 53.

The Y direction corresponds to the direction perpendicular to the sliding direction of the cam ring sliding surface 53.

The cam ring sliding surface 53 has an ellipsoidal surface portion 531. A height of an inside of the ellipsoidal surface portion 531 is higher than a height of a periphery of the ellipsoidal surface portion 531. In the ellipsoidal surface portion 531 of the first embodiment, an axial direction of the major axis of the ellipsoidal surface portion 531 is set to coincide with the direction (the Y direction) perpendicular to the sliding direction of the cam ring sliding surface 53, and an axial direction of the minor axis of the ellipsoidal surface portion 531 is set to coincide with the sliding direction (the X direction). Furthermore, an apex of the ellipsoidal surface portion 531 is indicated by Pv.

Figure 4A:
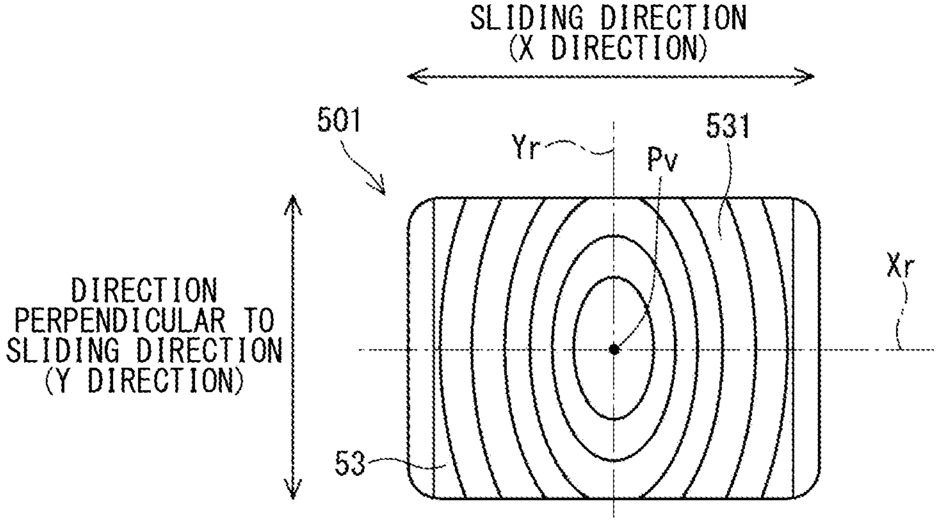
FIG. 4A is a plan view of the cam ring of the first embodiment of the group A.
Figure 4B:
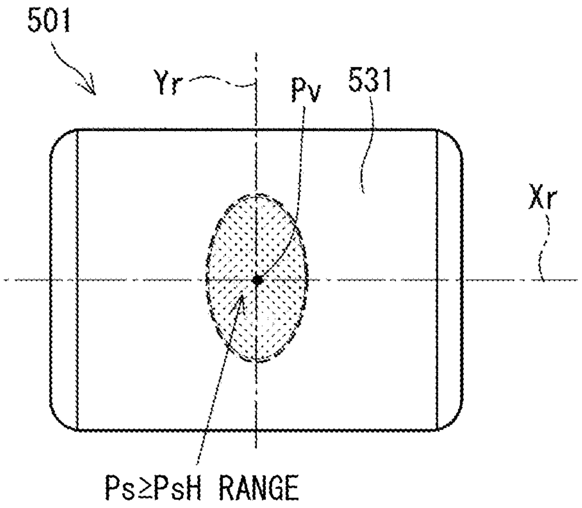
FIG. 4B is a schematic diagram showing a contact surface pressure range of the cam ring shown in FIG. 4A.
Figure 5A:
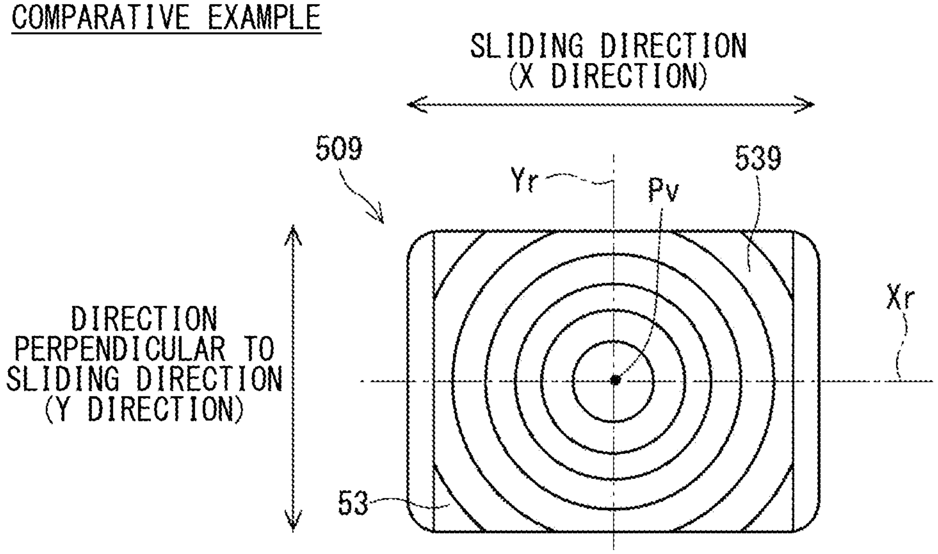
FIG. 5A is a plan view of a cam ring of a comparative example of the group A.
Figure 5B:
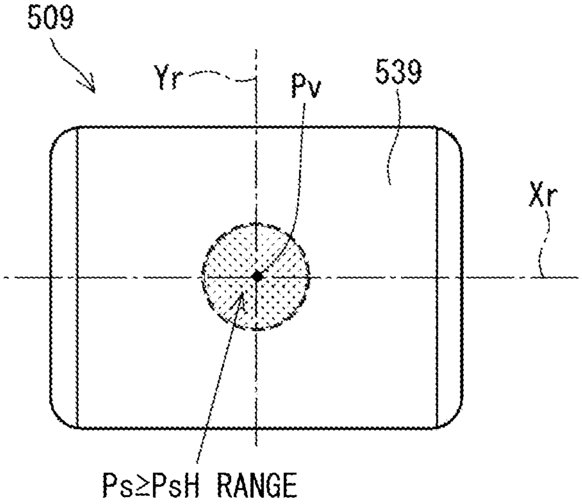
FIG. 5B is a schematic diagram showing a contact surface pressure range of the cam ring shown in FIG. 5A.

FIG. 5A shows a plan view of a cam ring 509 of a comparative example which has a spherical surface portion 539. Furthermore, FIG. 4B shows a contact surface pressure range at the time when the tappet 40 contacts the cam ring sliding surface 53 of the first embodiment, and FIG. 5B shows a contact surface pressure range at the time when the tappet 40 contacts the cam ring sliding surface 53 of the comparative example. A range, in which the contact surface pressure Ps is equal to or larger than a threshold value PsH, is indicated by an ellipse in the first embodiment and by a circle in the comparative example. In a case where an equal contact surface pressure threshold value PsH is set in the first embodiment and the comparative example, a size of an area of the ellipse of the first embodiment is larger than a size of an area of the circle of the comparative example. In other words, a maximum contact surface pressure of the first embodiment is smaller than a maximum contact surface pressure of the comparative example. When the convex form of the cam ring sliding surface 53 is set to be the ellipsoidal surface, the size of the contact surface pressure range, in which the contact surface pressure Ps is equal to or larger than the threshold value PsH, can be increased, and thereby the maximum contact surface pressure can be reduced. Therefore, the seizure resistance is improved.

Figure 6:
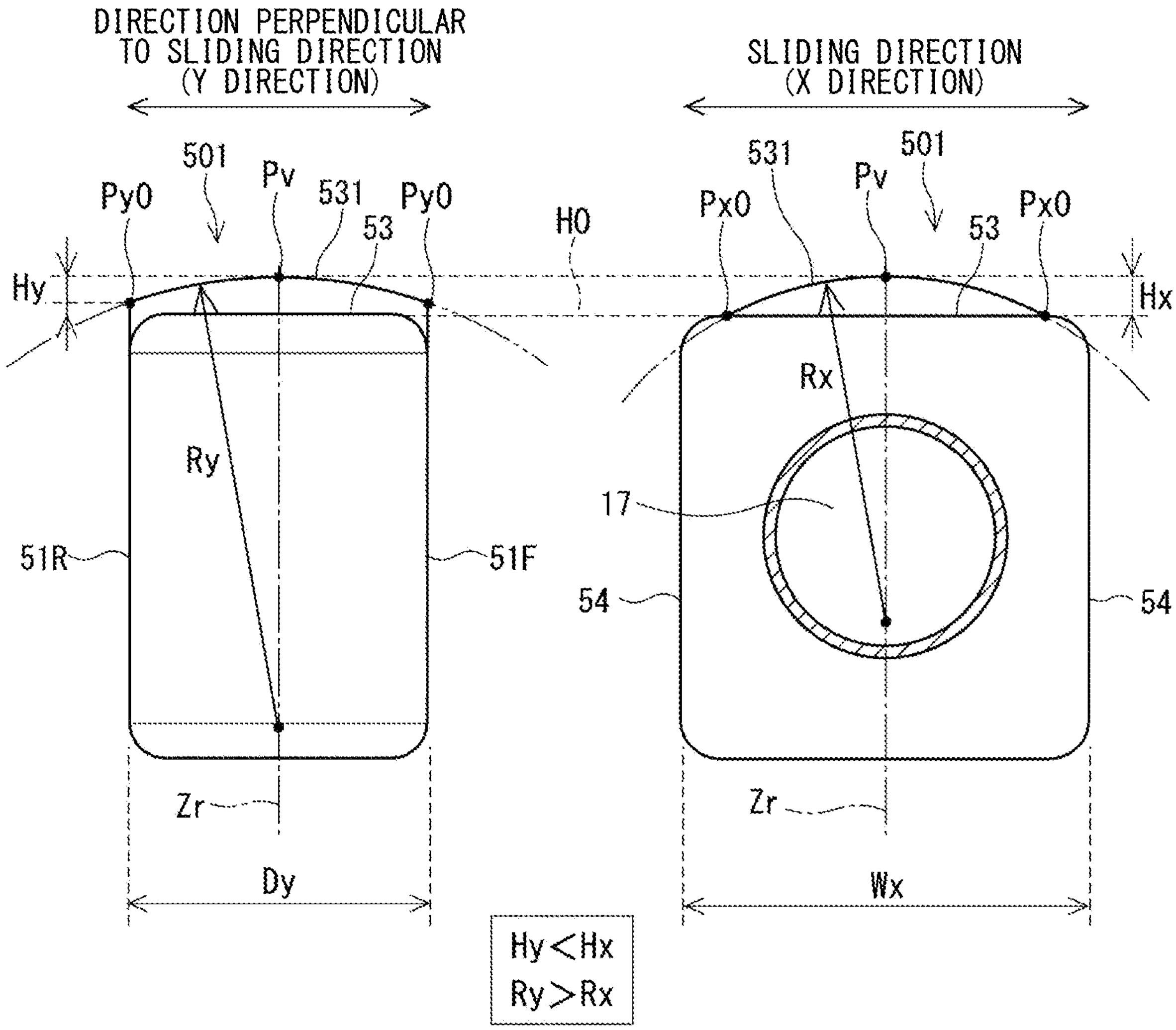
FIG. 6 is a diagram for describing a relationship of a projection height of an ellipsoidal surface portion.

With reference to FIG. 6, the relationship of the projection height of the ellipsoidal surface portion 531 will be described. The left side of FIG. 6 corresponds to FIG. 3A, and the right side of FIG. 6 corresponds to FIG. 3B. However, in FIG. 6, the projection height is further exaggerated for the descriptive purpose as compared with FIGS. 3A and 3B. A width of the cam ring 501 viewed from the front of the cam ring 501 is indicated by Wx, and a depth of the cam ring 501 viewed from the left side of the cam ring 501 is indicated by Dy. Furthermore, a height of a reference plane in the vicinity of the convex form of the cam ring sliding surface 53 is indicated by H0.

The front view of the cam ring 501, which is shown on the right side of FIG. 6, indicates a projection height (first projection height) Hx of the apex Pv of the ellipsoidal surface portion 531 that is measured from a location, at which two opposite end points Px0 of an ellipsoidal surface of the ellipsoidal surface portion 531 are located, to the apex Pv along a cross-section of the ellipsoidal surface portion 531 which extends through the apex Pv and is parallel with the plunger axis Zp in the sliding direction (the X direction). In the front view, an elliptical arc of the ellipsoidal surface portion 531 intersects the reference plane within the range of the width Wx, so that the two opposite end points Px0 of the ellipsoidal surface in the X direction exist on the reference plane. Therefore, the projection height Hx of the cam ring sliding surface 53 along the plane extending in the sliding direction (the X direction) is the height measured from the reference plane to the apex Pv.

The side view of the cam ring 501, which is shown on the left side of FIG. 6, indicates a projection height (second projection height) Hy of the apex Pv of the ellipsoidal surface portion 531 measured from a location, at which two opposite end points Py0 of the ellipsoidal surface of the ellipsoidal surface portion 531 are located, to the apex Pv along a cross-section of the ellipsoidal surface portion 531 which extends through the apex Pv and is parallel with the plunger axis Zp in the direction (the Y direction) perpendicular to the sliding direction. In the side view, an elliptical arc of the ellipsoidal surface portion 531 does not intersect the reference plane within the range of the depth Dy. Therefore, an intersection point, at which an extension line of a front surface 51F of the cam ring 501 intersects the elliptical arc, and an intersection point, at which an extension line of a rear surface 51R of the cam ring 501 intersects the elliptical arc, become two opposite end points Py0 of the ellipsoidal surface. That is, the two opposite end points Py0 of the ellipsoidal surface in the Y direction are located at a position that is higher than the height H0 of the reference plane.

In summary, the projection height Hx of the cam ring sliding surface 53 along the plane extending in the sliding direction (the X direction) is higher than the projection height Hy of the cam ring sliding surface 53 along the plane extending in the direction (the Y direction) perpendicular to the sliding direction. Furthermore, a radius of curvature Rx of the ellipsoidal surface of the cam ring sliding surface 53 along the plane in the sliding direction (the X direction) is smaller than a radius of curvature Ry of the ellipsoidal surface of the cam ring sliding surface 53 along the plane in the direction (the Y direction) perpendicular to the sliding direction.

Advantages

When a working pressure of the supply pump 100 is increased, an urging force of the tappet 40 against the cam ring sliding surface 53 is increased to cause an increase in the contact surface pressure. Therefore, a risk of the seizure between the tappet 40 and the cam ring sliding surface 53 increases. Thus, in the embodiment of the group A, each of the contour lines of the convex form of the cam ring sliding surface 53 is set to be the closed curve, such as the ellipse, which is other than the circle, and thereby the concentration of the contact surface pressure at a center portion of the cam ring sliding surface 53 is avoided, and the contact surface pressure is dispersed over the wide range. In this way, the maximum contact surface pressure can be reduced, and the seizure resistance can be improved.

Specifically, the convex form of the cam ring sliding surface 53 is formed by the ellipsoidal surface portion 531. Particularly, in the ellipsoidal surface portion 531 of the first embodiment, the axial direction of the major axis of the ellipsoidal surface portion 531 is set to coincide with the direction (the Y direction) perpendicular to the sliding direction of the cam ring sliding surface 53. Therefore, the ellipsoidal surface portion 531 can be more easily processed in comparison to a case where the axial direction of the major axis of the ellipsoidal surface portion 531 is set to coincide with the sliding direction (the X direction) of the cam ring sliding surface 53.

Second Embodiment of Group A

Figure 7A:
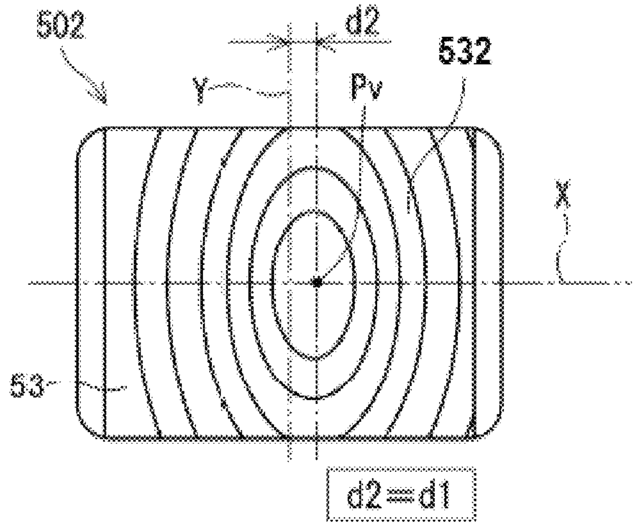
FIG. 7A is a plan view of a cam ring of a second embodiment of the group A.
Figure 7B:
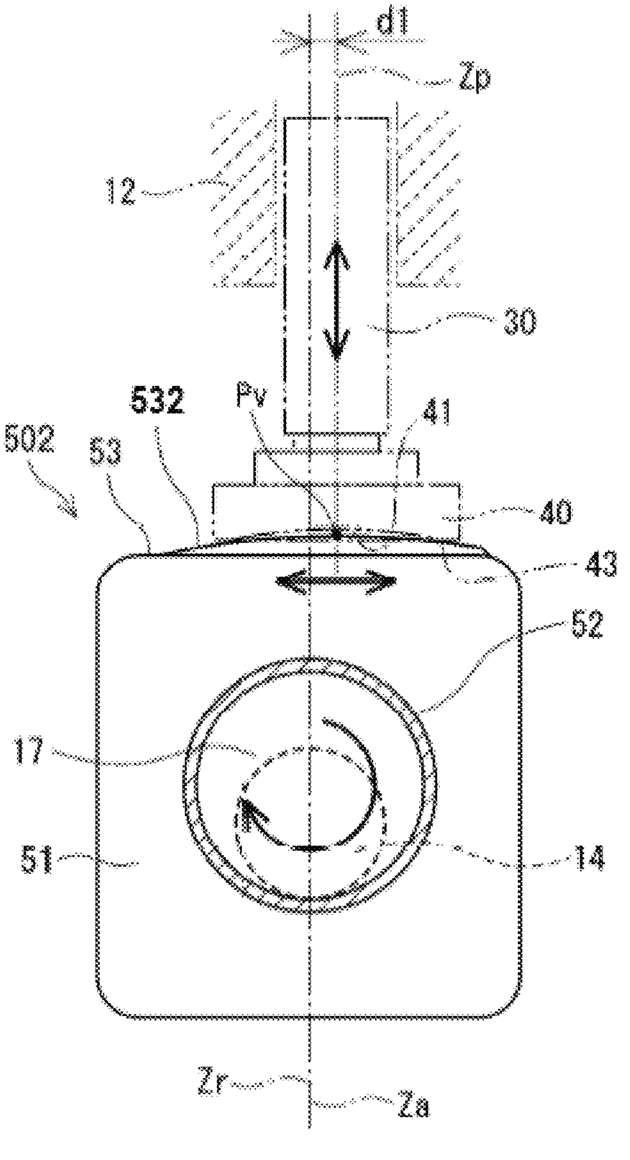
FIG. 7B is a front view of the cam ring shown in FIG. 7A.

The cam ring 502 of the second embodiment will be described with reference to FIGS. 7A and 7B. In the second embodiment, the apex Pv of the ellipsoidal surface portion 532 is eccentrically displaced from the center of the cam ring sliding surface 53. The amount of eccentricity d2 of the apex Pv from the center of the cam ring sliding surface 53 is equal to the amount of eccentricity d1 between the plunger axis Zp and the central reference line Za that extends through the camshaft center Ca. By eccentrically displacing the apex Pv of the ellipsoidal surface portion 532 from the center of the cam ring sliding surface 53 according to the amount of eccentricity d1 of the plunger axis Zp relative to the camshaft center Ca, it is effective in terms of both the oil film formability and the contact surface pressure dispersion.

Third Embodiment of Group A

Figure 8:
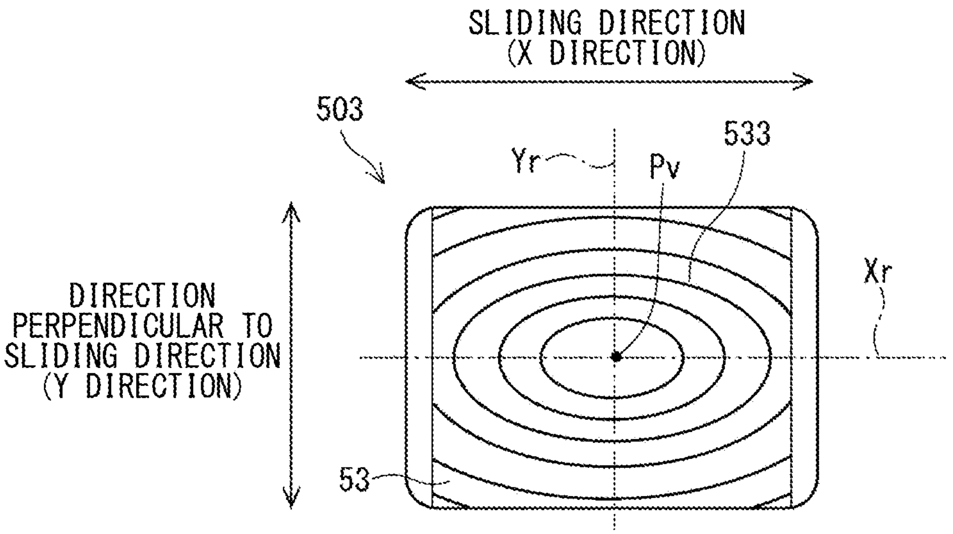
FIG. 8 is a plan view of a cam ring of a third embodiment of the group A.

The cam ring 503 of the third embodiment will be described with reference to FIG. 8. The third embodiment differs from the first embodiment with respect to the axial direction of the major axis and the axial direction of the minor axis of the ellipsoidal surface portion 533. In the ellipsoidal surface portion 533 of the third embodiment, the axial direction of the major axis of the ellipsoidal surface portion 533 is set to coincide with the sliding direction (the X direction) of the cam ring sliding surface 53, and the axial direction of the minor axis of the ellipsoidal surface portion 533 is set to coincide with the direction (the Y direction) perpendicular to the sliding direction. Even with this configuration, like in the first embodiment, the seizure resistance is improved by expanding the range, in which the contact surface pressure is equal to or larger than the predetermined contact surface pressure, in comparison to the spherical surface portion 539 of the comparative example.

Other Embodiments of Group A

The convex form of the cam ring sliding surface 53 is not limited to the ellipsoidal surface form, in which the axial direction of the major axis is set to coincide with the one of the sliding direction (the X direction) and the direction (the Y direction) perpendicular to the sliding direction, and the axial direction of the minor axis is set to coincide with the other one of the sliding direction (the X direction) and the direction (the Y direction) perpendicular to the sliding direction. For example, the convex form of the cam ring sliding surface 53 may be an ellipsoidal surface form, in which an axial direction of the major axis is set to coincide with an axial direction of an axis that is oblique to the X direction. Furthermore, the convex form of the cam ring sliding surface 53 may be any suitable form where each of the contour lines is a closed curve that is other than the circle, and the range, in which the contact surface pressure is equal to or larger than the predetermined value, is larger than that of the comparative example of FIGS. 5A and 5B. Here, the closed curve, which is other than the circle, includes a closed curve in an oblong shape, a closed curve in an oval shape, a closed curve in a gourd shape or the like in addition to a closed curve in an ellipse shape.

Group B

The supply pump of the group B will be described with reference to FIGS. 9 to 12B. In the supply pump of the group B, the tappet 404 has a resiliently deformable portion that enables resilient deformation of the tappet 404 such that a contact surface area between the tappet sliding surface 43 and the cam ring sliding surface 53 is increased when a load is applied to the tappet 404 toward the cam ring 50.

First Embodiment of Group B

Figure 9:
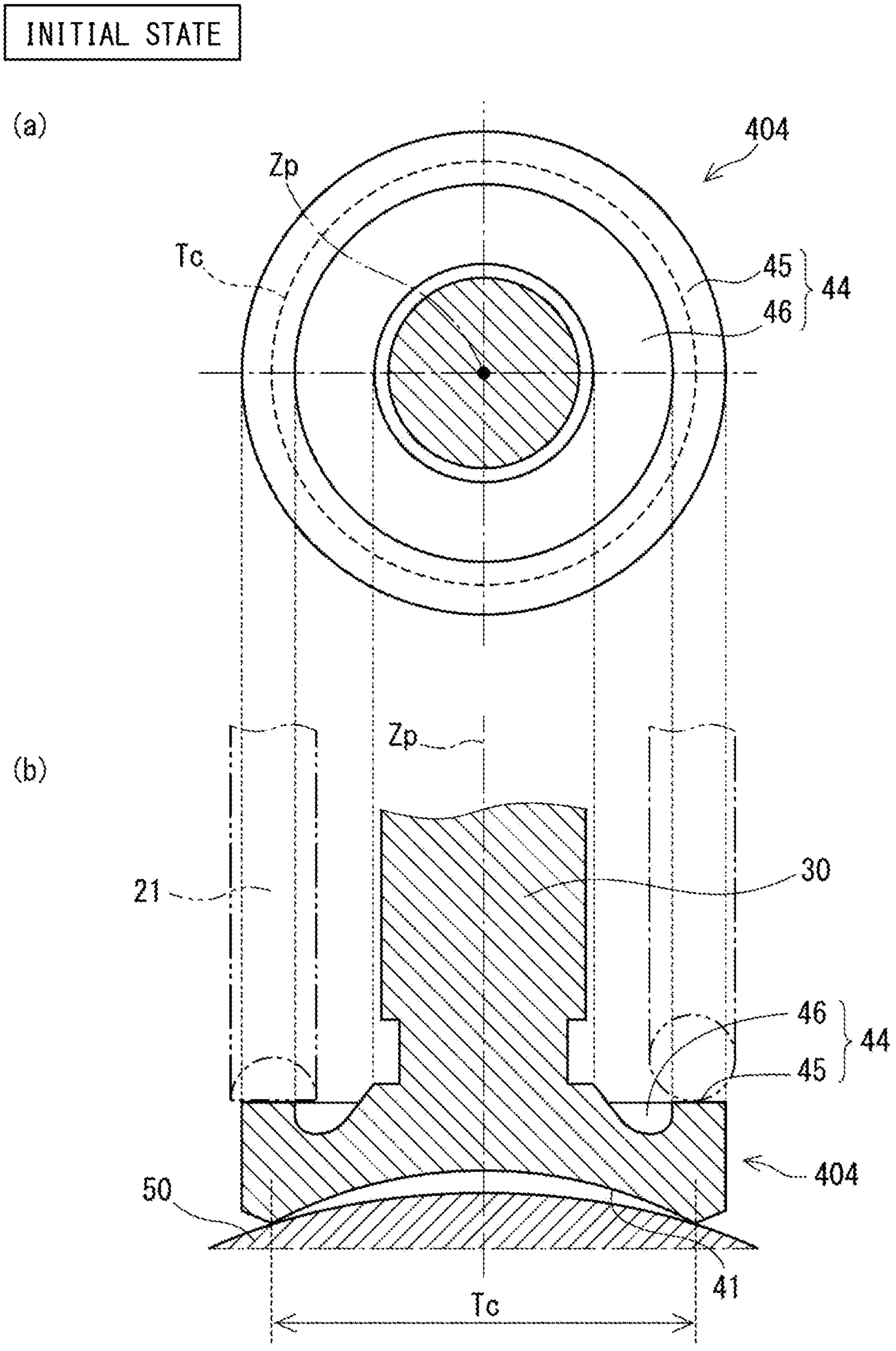
FIG. 9 is a diagram showing an initial state of a tappet of an embodiment of a group B.
Figure 10:
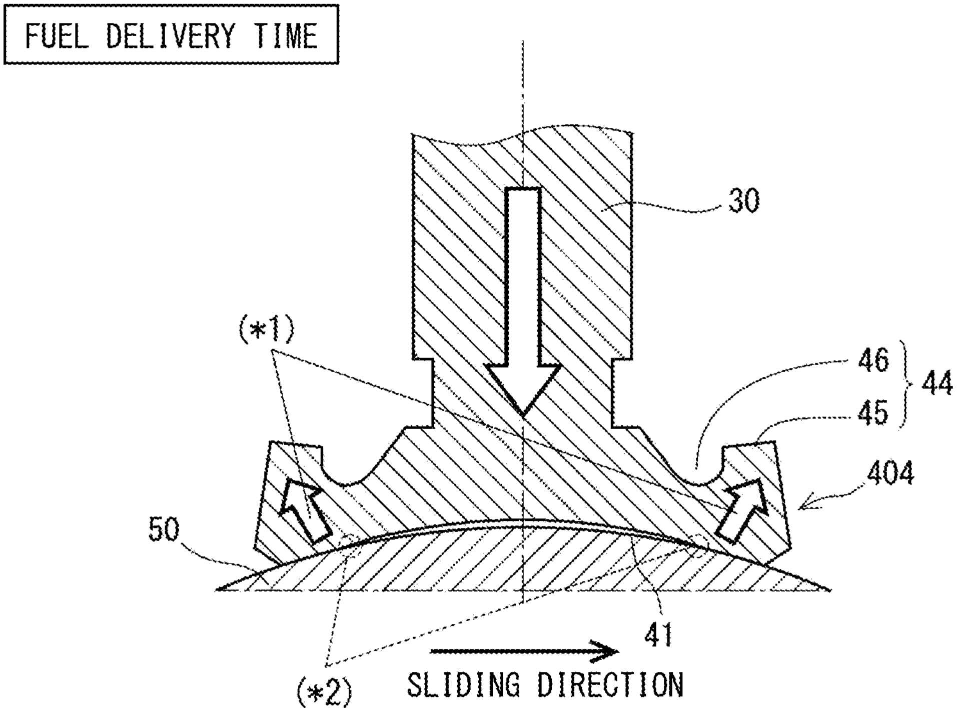
FIG. 10 is a diagram showing the tappet during a fuel delivery time (resiliently deformed state) of the tappet of the embodiment of the group B.

FIG. 9 shows the tappet 404 of the embodiment of the group B in an initial state, and FIG. 10 shows the tappet 404 during the time of pressurizing and delivery the fuel (hereinafter, referred to as delivery time of the fuel). The tappet 404 has an annular groove 46 which serves as the resiliently deformable portion and is formed at a tappet upper surface 44, which is a surface of the tappet 404 opposite to the tappet sliding surface 43. As shown in FIGS. 1 and 2, a portion of the tappet upper surface 44, which is adjacent to an outer peripheral edge of the tappet upper surface 44, functions as a spring seat 45 for the spring 21. The annular groove 46 is located on an inner side of the spring seat 45.

As discussed above, the tappet 404 has the tappet recess 41 that is formed at the tappet sliding surface 43 and is out of contact with the cam ring sliding surface 53. Here, the expression of "is out of contact with the cam ring sliding surface 53" refers to a positional relationship in the initial state where the load is not applied to the tappet 404. Furthermore, it is assumed that the cam ring 50, which is used together with the tappet 404, has the cam ring sliding surface 53, a center portion of which is shaped in the convex form, such as the ellipsoidal surface or the spherical surface, like in the embodiments of the group A or the comparative example of the group A.

The annular groove 46 is located on an inner side of "a closed curve Tc, which is formed by connecting a plurality of contact points between a peripheral edge of the tappet recess 41 and the cam ring sliding surface 53 in a state where the tappet 404 is resiliently deformed." In a case where each of the tappet recess 41 and the convex form of the cam ring sliding surface 53 is a spherical surface, ideally the closed curve Tc becomes a circle. For example, one or both of the tappet recess 41 and the convex form of the cam ring sliding surface 53 are the ellipsoidal surface, the closed curve Tc may possibly become an ellipse or another type of closed curve.

In FIG. 10, a block arrow at the plunger 30 indicates the load caused by the fuel pressure during the delivery time of the fuel. Due to this load, the tappet 404 is deformed from the vicinity of the annular groove 46 as indicated by block arrows at (* 1) in FIG. 10. Then, as indicated at (* 2) in FIG. 10, the peripheral edge of the tappet recess 41 and its periphery contact the cam ring sliding surface 53, and thereby the load is received through a wide range. Therefore, an edge contact surface pressure is reduced. Furthermore, when the tappet recess 41 and the convex form of the cam ring sliding surface 53 are respectively formed as the spherical surfaces which have a generally equal radius, the advantage of enhancing the wedge effect and promoting the formation of the oil film can be obtained.

Figure 11:
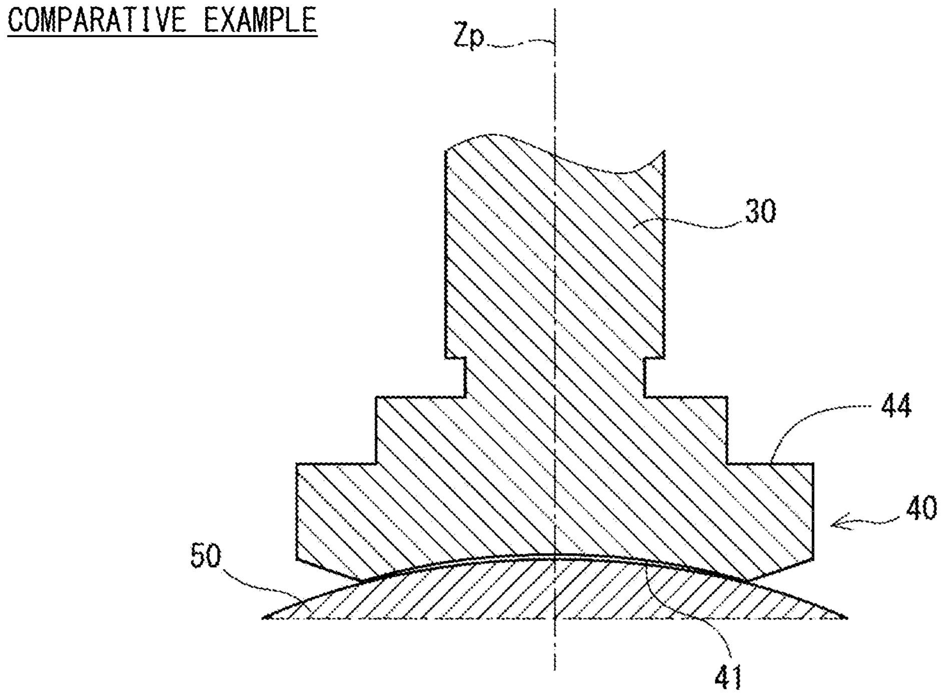
FIG. 11 is a diagram showing a tappet of a comparative example of the group B in an initial state.

FIG. 11 shows the tappet 40 of the comparative example. The tappet 40 of the comparative example does not have the annular groove 46, which serves as the resiliently deformable portion, and the tappet upper surface 44 of the tappet 40 is flat. Like the embodiment of the group B, the tappet recess 41 is formed at the tappet sliding surface 43. The tappet 40 of the comparative example is not easily deformed even when the load is applied to the tappet 40 toward the cam ring 50 during the delivery time of the fuel.

Figure 12A:
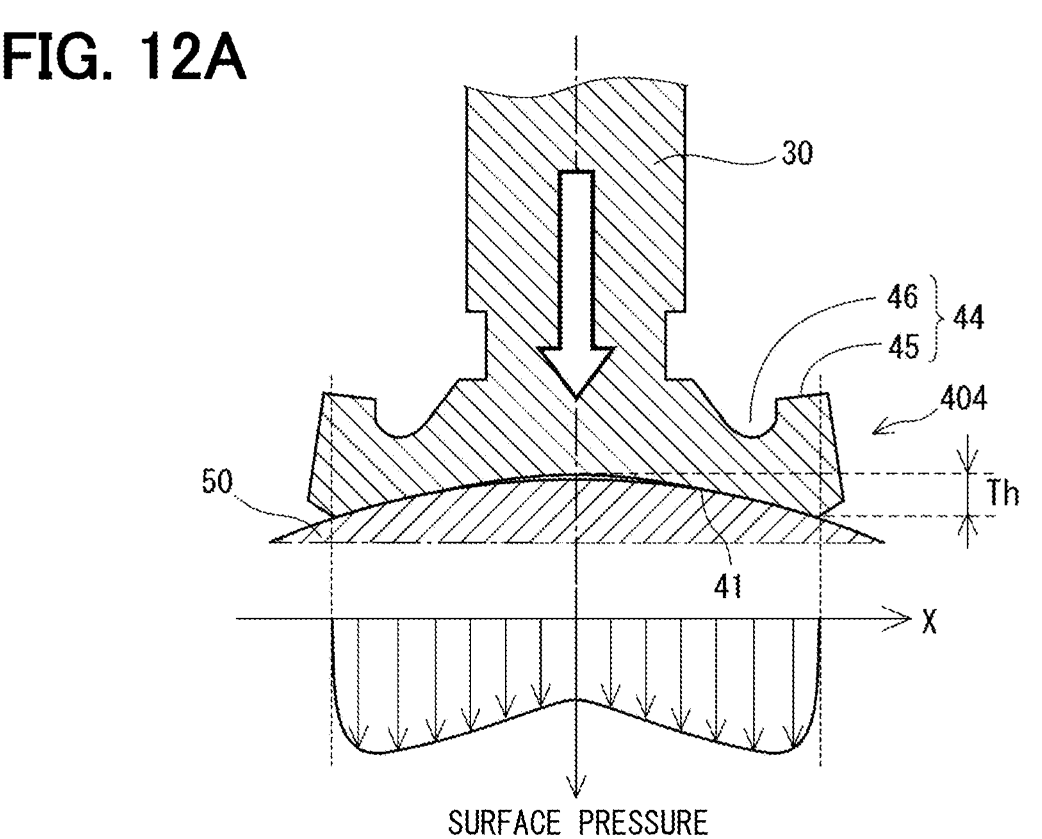
FIG. 12A is a diagram showing a contact surface pressure distribution of the tappet of the embodiment of the group B.
Figure 12B:
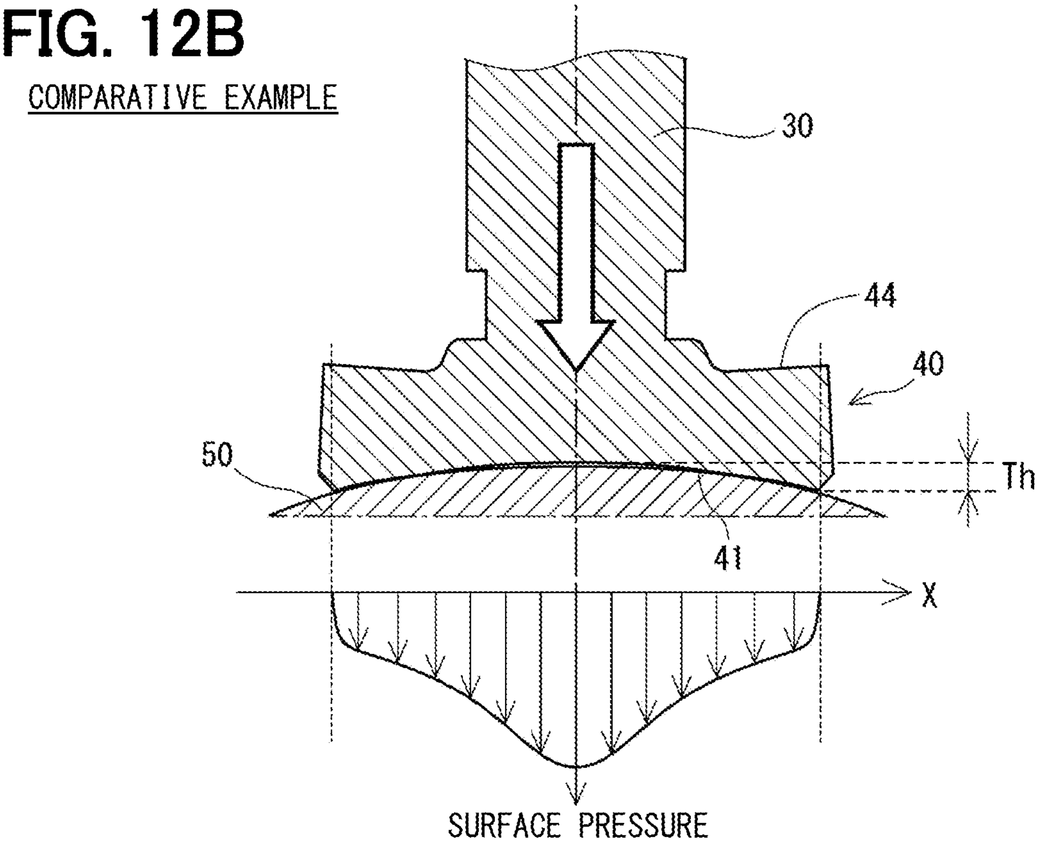
FIG. 12B is a diagram showing a contact surface pressure distribution of the tappet of the comparative example of the group B.

A contact surface pressure distribution of the embodiment and a contact surface pressure distribution of the comparative example will be compared with reference to FIGS. 12A and 12B. Like in FIG. 10, a block arrow at the plunger 30 in each of FIGS. 12A and 12B indicates the load caused by the fuel pressure during the delivery time of the fuel. Since the amount of deformation is small in the tappet 40 of the comparative example, the contact surface pressure is concentrated at the center portion. Therefore, in the comparative example, a depth Th of the tappet recess 41 in the initial state needs to be set small. In comparison to this, the tappet 404 of the embodiment can be resiliently deformed due to the annular groove 46. Thus, the contact surface pressure can be dispersed. Therefore, the depth Th of the tappet recess 41 in the initial state can be set large.

Advantages

By providing the annular groove 46 at the tappet 404, it is possible to obtain the advantage of dispersing the contact surface pressure at the time of applying the load to the tappet 404. In the case where the depth of the tappet recess 41 is set small (e.g., about 1 μm), it is difficult to obtain the processing accuracy. According to the embodiment of the group B, even when the depth of the tappet recess 41 is set large, the deformation of the tappet 404 can be absorbed. Thus, the processability is improved.

Furthermore, the annular groove 46 is located on the inner side of "the closed curve Tc, which is formed by connecting the plurality of contact points between the peripheral edge of the tappet recess 41 and the cam ring sliding surface 53 in the state where the tappet 404 is resiliently deformed." Therefore, when the load is applied to the tappet 404 toward the cam ring 50, the resilient deformation of the tappet 404 occurs such that the tappet sliding surface 43 and the cam ring sliding surface 53 contact with each other at the location on the inner side of the closed curve Tc. Therefore, the effect of the resilient deformation can be reliably obtained.

Other Embodiments of Group B

The resiliently deformable portion is not limited to the annular groove 46. Specifically, the resiliently deformable portion needs to be only a portion that enables resilient deformation of the tappet 404 in a manner that increases the contact surface area between the tappet sliding surface 43 and the cam ring sliding surface 53. Furthermore, the resiliently deformable portion is not limited to the annular groove that continuously extends in the circumferential direction. For example, the resiliently deformable portion may be a plurality of recesses that are discontinuous in the circumferential direction.

Group C

The supply pump of the group C will be described with reference to FIGS. 13A to 16B. In the supply pump of the group C, the cam ring 505, 506 has stress relaxation grooves 555, 556 formed at the cam ring non-sliding surfaces 54 of the cam ring 505, 506. The cam ring non-sliding surfaces 54 extends in the direction parallel with the camshaft 14 and are perpendicular to the cam ring sliding surfaces 53.

Each of the stress relaxation grooves 555, 556 extends in a direction that intersects the axial direction of the plunger axis Zp and relax the transmission of the stress applied in the axial direction of the plunger axis Zp. In the description of the group C, the cam ring sliding surface 53 is shortened as "sliding surface 53," and the cam ring non-sliding surface 54 is shortened as "non-sliding surface 54."

First Embodiment of Group C

Figure 13A:
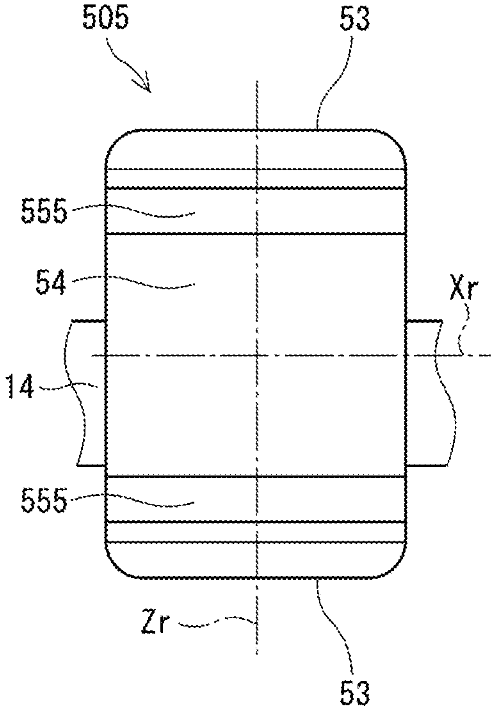
FIG. 13A is a left side view of a cam ring of a first embodiment of a group C.
Figure 13B:
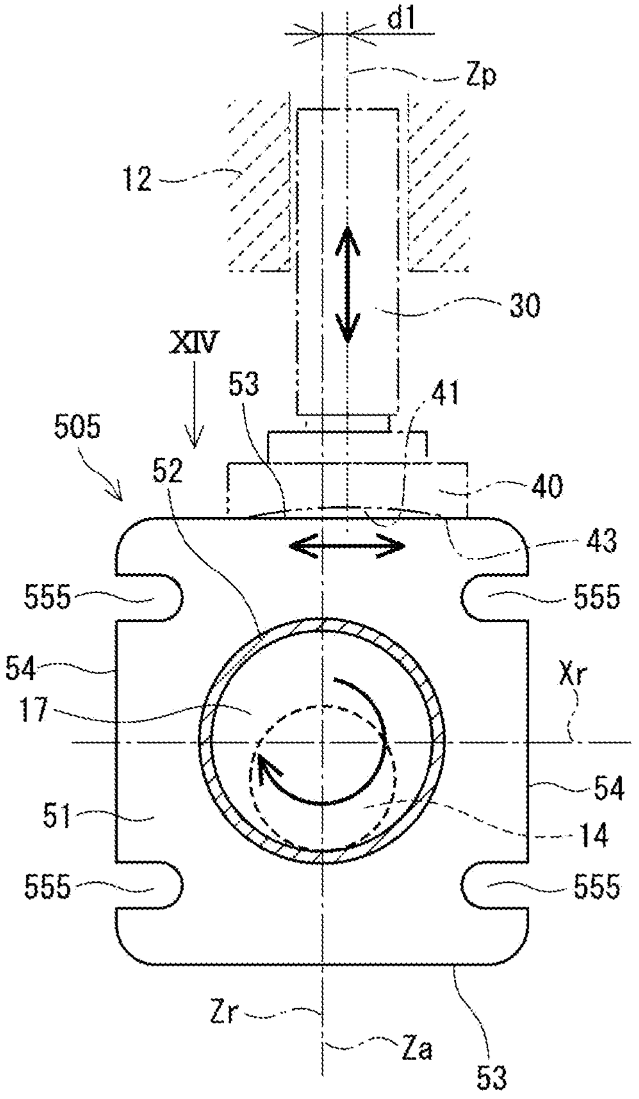
FIG. 13B is a front view of the cam ring shown in FIG. 13A.
Figure 14:
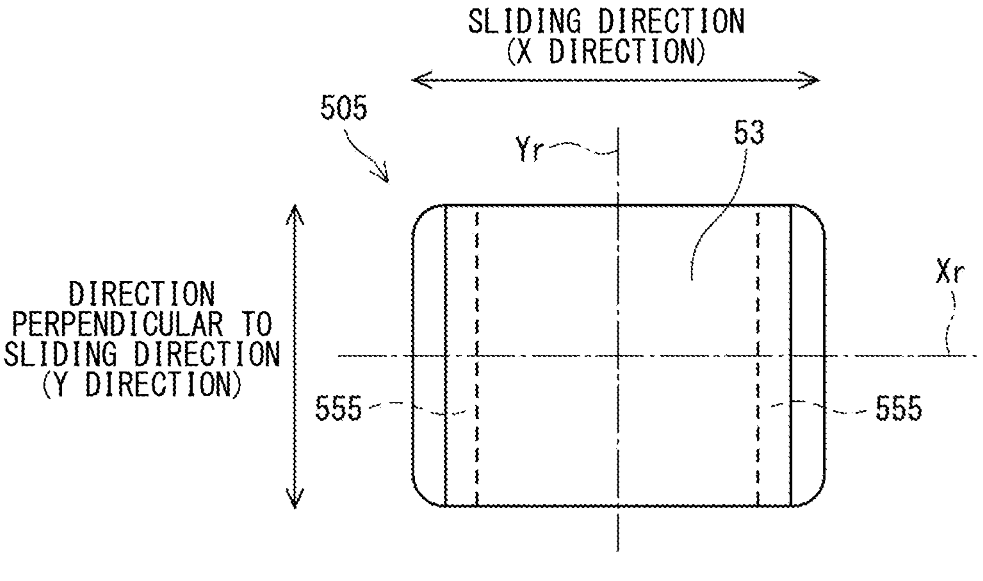
FIG. 14 is a plan view of a cam ring of the first embodiment of the group C.

FIGS. 13A to 14 indicate the cam ring 505 of the first embodiment of the group C. In the front view of FIG. 13B, the arcuate arrow indicates the rotation of the camshaft 14, and the double-sided arrow in the left-to-right direction indicates the slide of the cam ring 505. Also, the double-sided arrow in the up-to-down direction indicates the reciprocation of the plunger 30.

The cam ring 505 has four stress relaxation grooves 555 that are provided at four locations that include an upper end portion and a lower end portion of each of the left non-sliding surface 54 and the right non-sliding surface 54 of the cam ring 505. Each of the stress relaxation grooves 555 extends in the direction parallel with the camshaft 14, i.e., extends in the direction perpendicular to the axial direction of the plunger axis Zp. In the first embodiment, each of the stress relaxation grooves 555 is uniformly formed along an entire extent of the stress relaxation groove 555 in the direction (the Y direction) perpendicular to the sliding direction, so that the stress relaxation groove 555 can be easily processed.

Advantages

Figure 15A:
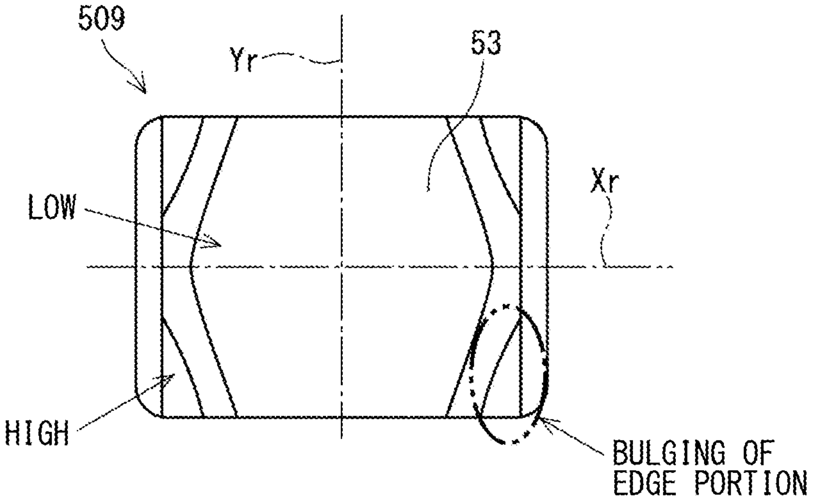
FIG. 15A is a plan view of a cam ring of a comparative example of the group C showing deformation of the cam ring.
Figure 15B:
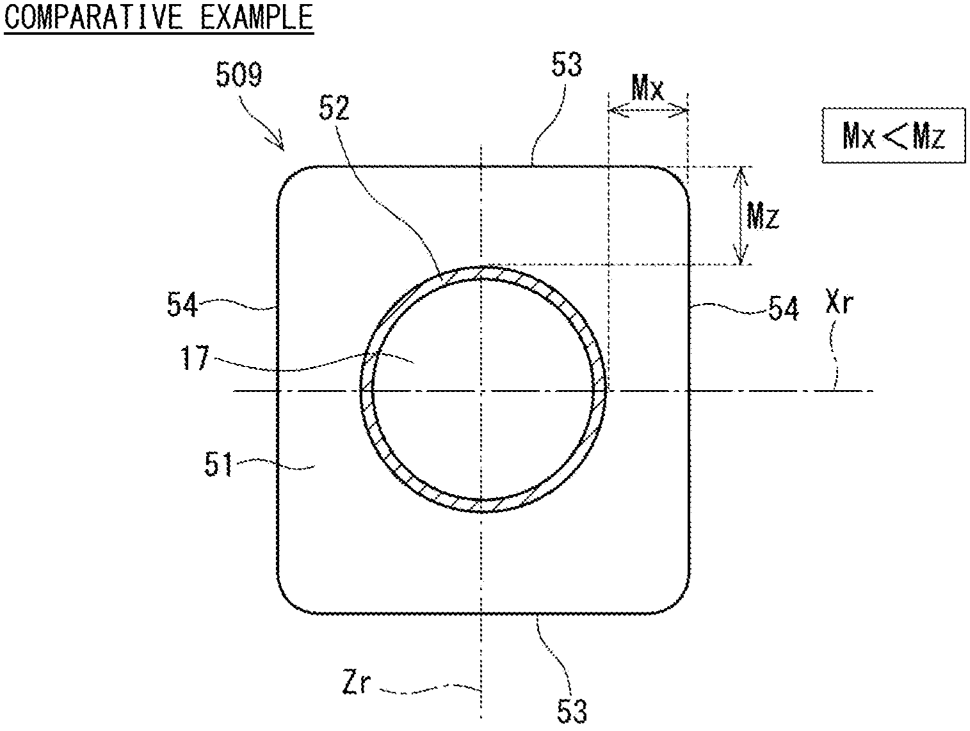
FIG. 15B is a front view of the cam ring shown in FIG. 15A.

A disadvantage of the cam ring 509 of the comparative example, which does not have the stress relaxation grooves, will be described with reference to FIGS. 15A and 15B. In the plan view, four corners, which are provided at two opposite sides of the cam ring sliding surface 53 in the sliding direction (the X direction) and two opposite sides of the cam ring sliding surface 53 in the direction (the Y direction) perpendicular to the sliding direction, will be referred to as four edge portions. When the direction of the reciprocating motion of the tappet 40 is reversed, the contact surface pressure of each of the edge portion is increased, and thereby the edge portions tend to be deformed and bulged.

Furthermore, a margin in the height direction (Z direction) from the outer periphery of the bush 52 to the cam ring sliding surface 53 is defined as a margin Mz, and a margin in the sliding direction (the X direction) from the outer periphery of the bush 52 to the cam ring non-sliding surface 54 is defined as a margin Mx. When the margin Mz in the height direction is larger than the margin Mx in the sliding direction, the non-sliding surfaces 54 tend to be largely deformed. For example, in a case of a cam ring that is used in a two-cylinder pump and has a relatively small lift amount, at the time of press-fitting the bush 52 into the cam ring, there is a concern that the non-sliding surfaces 54 are bulged, and the sliding surfaces 53 are recessed. Therefore, particularly, there is a concern that the contact surface pressure is increased at the time when the tappet 40 passes over the edge portions.

In view of the above point, in the embodiment of the group C, the stress relaxation grooves 555 are formed at the cam ring non-sliding surfaces 54. Therefore, it is possible to disperse the stress, which is generated by the contact surface pressure, by allowing the deformation of the edge portion upon application of the load to the edge portion. This is particularly effective for the cam ring that has the relatively small lift amount in the two-cylinder pump.

Second Embodiment of Group C

Figure 16A:
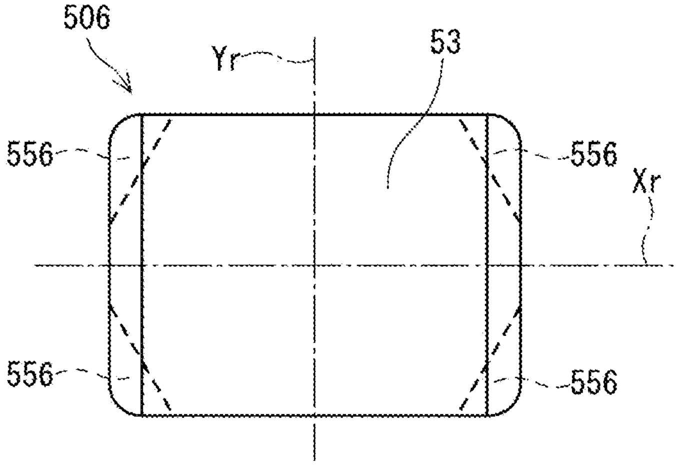
FIG. 16A is a plan view of a cam ring of a second embodiment of the group C.
Figure 16B:
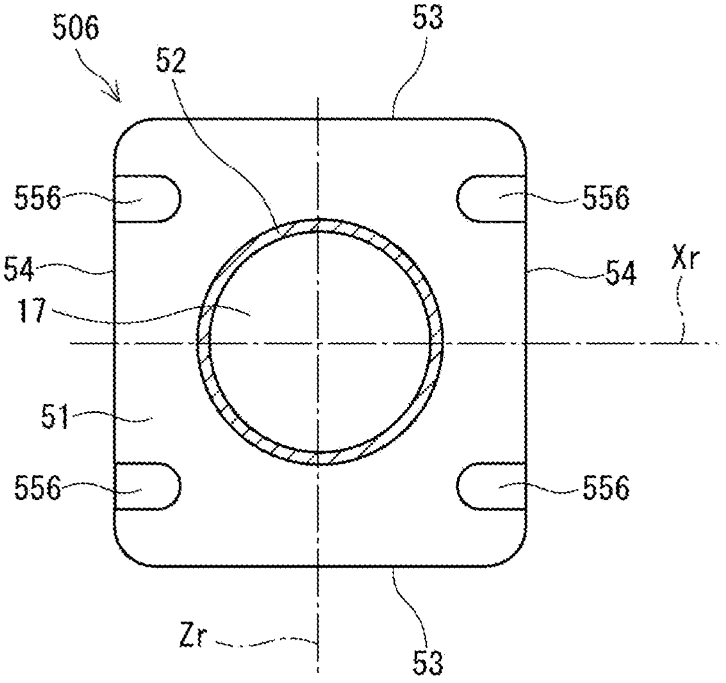
FIG. 16B is a front view of the cam ring shown in FIG. 16A.

FIGS. 16A and 16B indicate the cam ring 506 of the second embodiment of the group C. In the second embodiment, the stress relaxation grooves 556 are formed at four locations that respectively correspond to four edge portions of the cam ring sliding surface 53 which are located at two opposite sides in the sliding direction (the X direction) and two opposite sides in the direction (the Y direction) perpendicular to the sliding direction. Specifically, the stress relaxation grooves 556 are formed at a total of eight locations that include the four locations at the upper side of the cam ring 506 in the axial direction of the plunger axis Zp and the four locations at the lower side of the cam ring 506 in the axial direction of the plunger axis Zp. By forming each of the stress relaxation grooves 556 at the location corresponding to the edge portion that is easily deformed by the load, it is possible to limit a decrease in the strength of the entire cam ring 506.

Other Embodiments of Group C

The extending direction of each stress relaxation groove is not limited to the direction perpendicular to the axial direction of the plunger axis Zp. Specifically, the extending direction of each stress relaxation groove may be an intersecting direction that intersects the axial direction of the plunger axis Zp, and this intersecting direction may include a direction that is tilted relative to the axial direction of the plunger axis Zp. It has the advantage of dispersing the contact surface pressure of the tappet 40 except a case where the grooves are formed parallel to the axial direction of the plunger axis Zp.

In the front view of the cam ring, the stress relaxation grooves do not have to be symmetrical with respect to the X direction center line Xr and the Z direction center line Zr of the cam ring. For example, the stress relaxation grooves may be arranged such that the stress relaxation grooves are offset downward at the non-sliding surface 54 on the left side, and the stress relaxation grooves are offset upward at the non-sliding surface 54 on the right side. Even in this configuration, the stress relaxation grooves are respectively formed at the positions that corresponds to the edge portions at the four locations.

Group D

The supply pump of the group D will be described with reference to FIGS. 17A to 20B. In the supply pump of the group D, the cam ring 507, 508 has a cooling recess 577, 578 in at least one of two opposite end portions of each cam ring sliding surface 53 which are opposite to each other in the sliding direction of the cam ring sliding surface 53. The fuel flows into the cooling recess 577, 578 to cool the cam ring sliding surface 53. In the embodiments of the group D, the fluid is described as the fuel.

First Embodiment of Group D

Figure 17A:
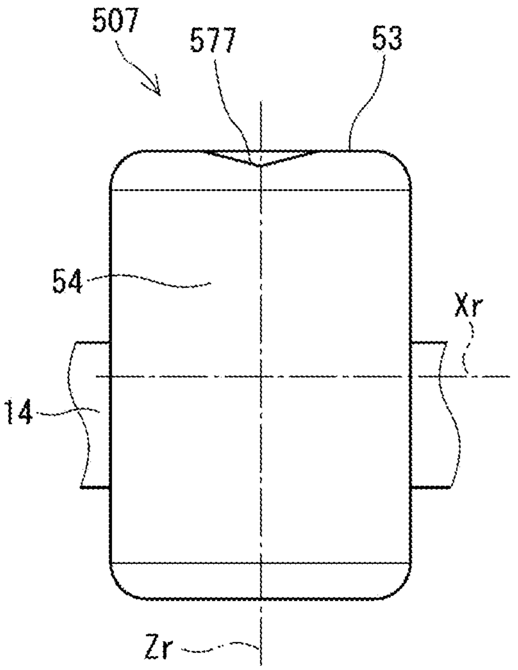
FIG. 17A is a left side view of a cam ring of a first embodiment of a group D.
Figure 17B:
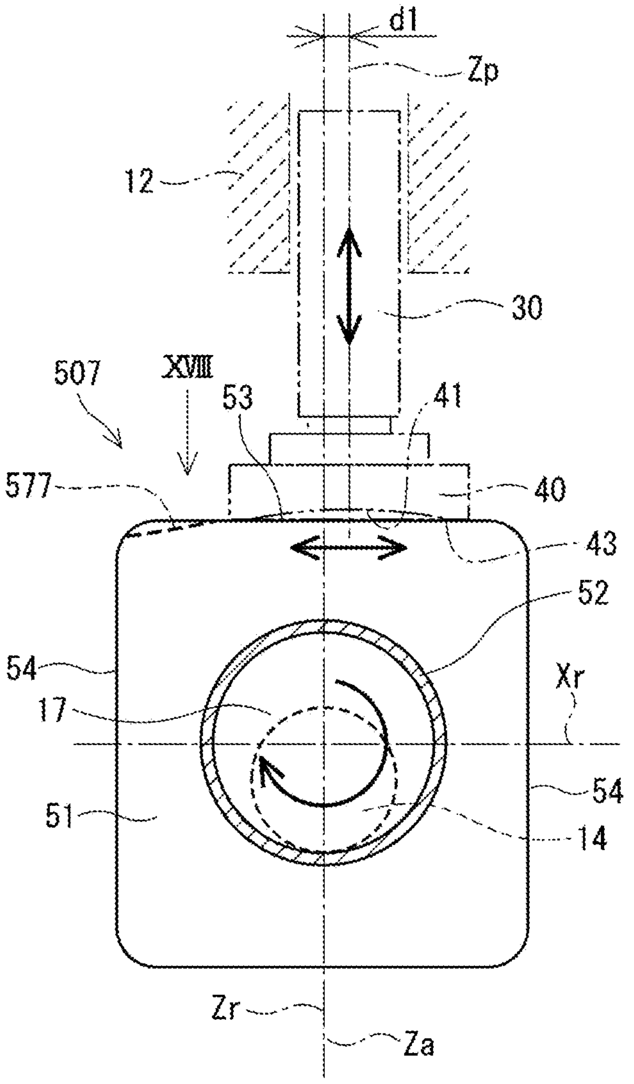
FIG. 17B is a front view of the cam ring shown in FIG. 17A.
Figure 18A:
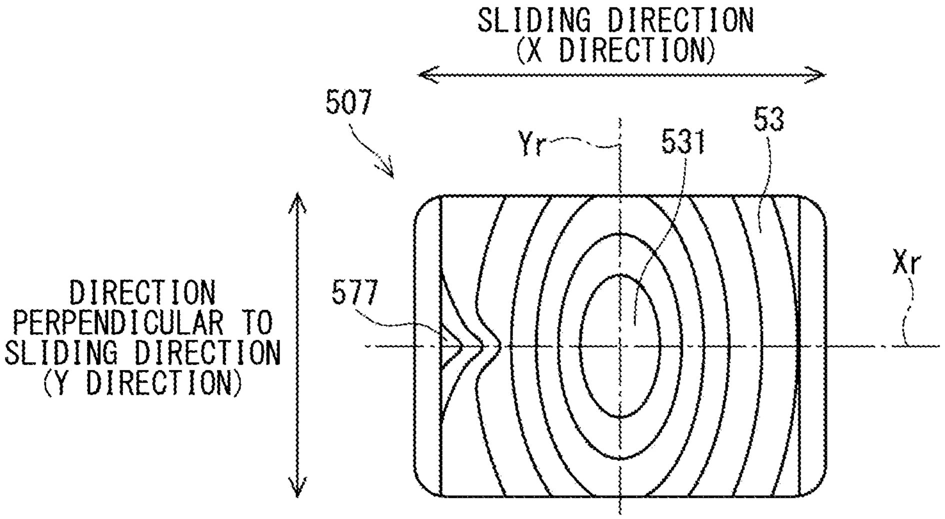
FIG. 18A is a plan view of a cam ring of the first embodiment of the group D.
Figure 18B:
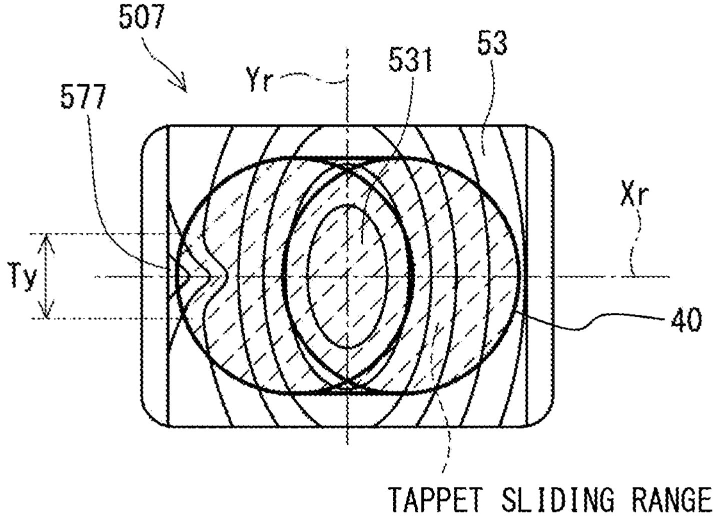
FIG. 18B is a plan view showing a sliding range of the tappet of the first embodiment of the group D.

FIGS. 17A to 18B indicate the cam ring 507 of the first embodiment of the group D. In the front view of FIG. 17B, the arcuate arrow indicates the rotation of the camshaft 14, and the double-sided arrow in the left-to-right direction indicates the slide of the cam ring 507. Also, the double-sided arrow in the up-to-down direction indicates the reciprocation of the plunger 30. In FIGS. 18A and 18B, it is assumed that the cam ring sliding surface 53 has the ellipsoidal surface portion 531 like in the first embodiment of the group A.

The cam ring 507 has the cooling recess 577 at the left end portion of the cam ring sliding surface 53 in the sliding direction in FIG. 17B. The cooling recess 577 of the cam ring sliding surfaces 53 exists on one side and the other side of the X direction center line Xr such that the cooling recess 577 is in a form of a V shape and is formed at a center portion of the cam ring sliding surface 53 which is centered in the direction (the Y direction) perpendicular to the sliding direction.

In FIG. 18B, a sliding range of the tappet 40 is indicated by hatching with broken lines. The cooling recess 577 of the first embodiment is formed only inside a contact range Ty in which the tappet 40 contacts the cam ring sliding surface 53 in the direction (the Y direction) perpendicular to the sliding direction of the cam ring sliding surface 53.

Figure 19:
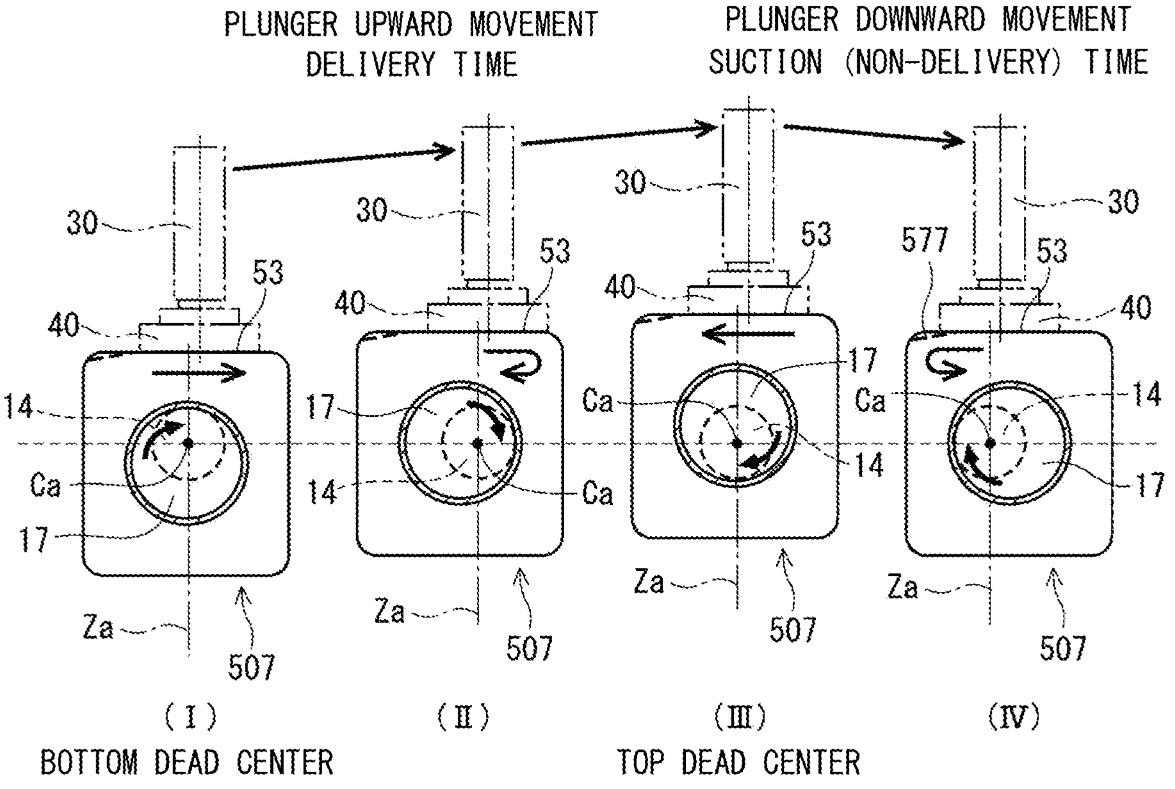
FIG. 19 is a diagram for describing operational strokes of a supply pump.

FIG. 19 indicates operational strokes I-IV of the supply pump 100. The plunger 30 moves upward away from the camshaft 14 from the bottom dead center I to the top dead center III to pressurize and deliver the fuel. After the top dead center III, the plunger 30 moves downward and approaches the camshaft 14. This period corresponds to the suction time of the fuel, i.e., "non-delivery time".

In FIGS. 18A and 18B, the left side of the center of the cam ring sliding surface 53 in the sliding direction (the X direction) corresponds to the side, toward which the tappet 40 slides during the time of moving the plunger 30 toward the camshaft 14, i.e., during the non-delivery time. Furthermore, the right side of the center of the cam ring sliding surface 53 in the sliding direction (the X direction) corresponds to the side, toward which the tappet 40 slides during the time of moving the plunger 30 away from the camshaft 14, i.e., during the delivery time. The cooling recess 577 of the first embodiment is formed at the side, toward which the tappet 40 slides during the non-delivery time, and is not formed at the other side, toward which the tappet 40 slides during the delivery time.

Advantages

As one of the seizure mechanisms between the cam ring 507 and the tappet 40, there is a mode in which heat is trapped and stored in the cam ring sliding surface 53, so that the temperature rises to near the melting point of the base material, and the seizure occurs. With respect to this, in the existing technique, by eccentrically displacing the sliding center (the plunger axis Zp) of the tappet 40 and the center Ca of the camshaft 14 relative to each other, the tappet 40 is overlapped from the cam ring sliding surface 53, and thereby the fuel having the low temperature is supplied to the inside of the sliding surface. According to the embodiment of the group D, the fuel supply to the inside of the sliding surface can be promoted, and thereby the temperature increase can be limited. Thus, the seizure resistance is improved.

However, when the size of the cooling recess 577 becomes larger than necessary, the contact surface area between the tappet 40 and the cam ring sliding surface 53 is decreased, and this is disadvantageous in terms of the contact surface pressure reduction and the oil film formability. Therefore, by locally providing the cooling recess 577, the contact surface area between the tappet 40 and the cam ring sliding surface 53 can be maintained to a maximum level. Furthermore, by forming the cooling recess 577 only on the side, toward which the tappet 40 slides during the non-delivery time, it is possible to limit the deterioration in the oil film formability in the range, in which the high load is applied during the delivery time.

Second Embodiment of Group D

Figure 20A:
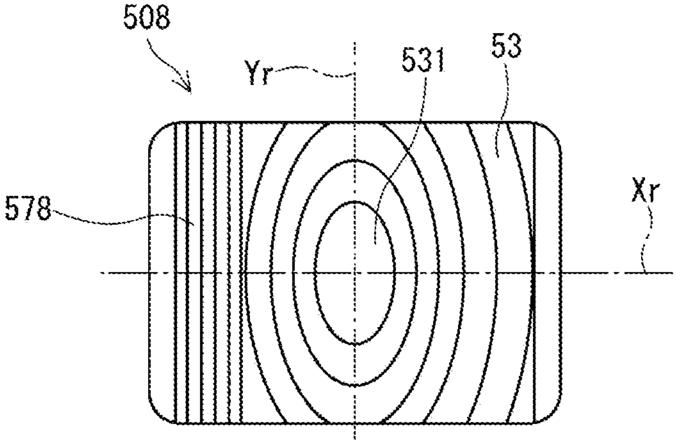
FIG. 20A is a plan view of a cam ring of a second embodiment of the group D.
Figure 20B:
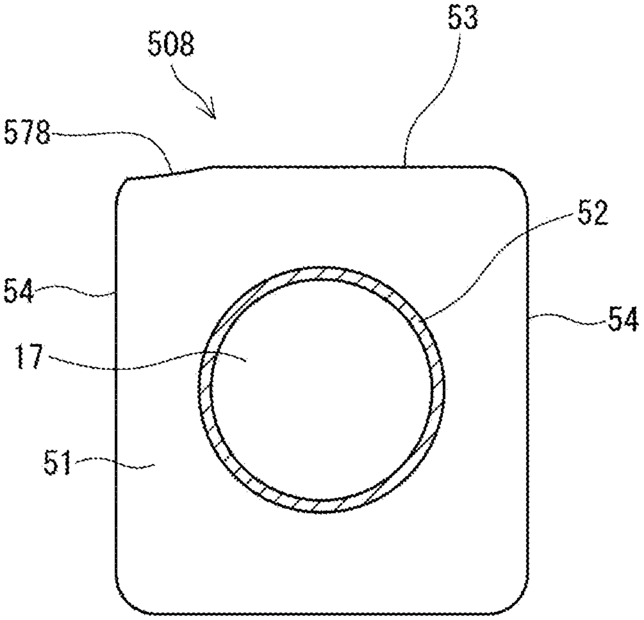
FIG. 20B is a front view of the cam ring shown in FIG. 20A.

FIGS. 20A and 20B indicate the cam ring 508 of the second embodiment of the group D. In FIG. 20A, it is assumed that the cam ring sliding surface 53 has the ellipsoidal surface portion 531 like in the first embodiment of the group A. In the second embodiment, the cooling recess 578 is formed by a sloped surface which extends along an entire extent of the cam ring sliding surface 53 in the direction (the Y direction) perpendicular to the sliding direction. With this configuration, the amount of the fuel flowing into the cooling recess 578 is increased, and thereby the cooling performance is improved. In addition, the processing of the cooling recess 578 is easier than in the first embodiment.

Other Embodiments of Group D

From the viewpoint of the cooling performance of the cam ring sliding surface 53, the cooling recess may be formed in both of the two opposite end portions of the cam ring sliding surface 53 which are opposite to each other in the sliding direction. It is preferable that the optimum size and the optimum location of the cooling recesses are determined from the viewpoint of securing the area where the cam ring sliding surface 53 receives the load of the tappet 40 and the viewpoint of cooling performance.

Other Embodiments Common to Groups A to D

The fluid, which is delivered by the plunger of the supply pump, is not limited to the fuel or the lubricating oil mixed fuel and may be a lubricating oil containing no fuel.

The embodiments of the groups A to D are not limited to those implemented independently, and embodiments of two or more groups may be combined and implemented.

As described above, the present disclosure is not limited to the above embodiments and can be implemented in various forms without departing from the scope of the present disclosure.

What is claimed is:

1. A supply pump comprising:

a camshaft that is configured to be rotated;

a cam that is eccentric to the camshaft and is configured to rotate integrally with the camshaft;

a cam ring that is configured to revolve around the camshaft without rotating while the cam ring slides along an outer periphery of the cam;

a tappet that is configured to reciprocate in a direction perpendicular to the camshaft in response to revolution of the cam ring such that the tappet slides along a cam ring sliding surface which is an outer peripheral surface of the cam ring that extends in a direction parallel with the camshaft; and a plunger that is configured to reciprocate together with the tappet to pressurize and deliver fluid, wherein:

the tappet has a tappet recess formed at a tappet sliding surface which is opposed to the cam ring sliding surface, wherein the tappet recess is out of contact with the cam ring sliding surface;

the cam ring sliding surface is shaped in a convex form while a contour line of the convex form is a closed curve that is other than a circle, wherein a height of an inside of the cam ring sliding surface is higher than a height of a periphery of the cam ring sliding surface;

an ellipsoidal surface portion is formed at the cam ring sliding surface such that an axial direction of a major axis of the ellipsoidal surface portion is set to coincide with one of a sliding direction of the cam ring sliding surface and a direction perpendicular to the sliding direction, and an axial direction of a minor axis of the ellipsoidal surface portion is set to coincide with another one of the sliding direction and the direction perpendicular to the sliding direction; and with respect to a projection height of an apex of the ellipsoidal surface portion measured from a location, at which two opposite end points of an ellipsoidal surface of the ellipsoidal surface portion are located, to the apex in a cross-section which extends through the apex and is parallel with an axis of the plunger, the measured projection height of the apex along a plane extending in the sliding direction of the cam ring sliding surface is higher than the measured projection height of the apex along a plane extending in the direction perpendicular to the sliding direction.

2. The supply pump according to claim 1, wherein the axial direction of the major axis of the ellipsoidal surface portion is set to coincide with the direction perpendicular to the sliding direction of the cam ring sliding surface.

3. The supply pump according to claim 1, wherein the apex of the ellipsoidal surface portion is eccentrically displaced from a center of the cam ring sliding surface.

4. The supply pump according to claim 3, wherein an amount of eccentricity of the apex of the ellipsoidal surface portion from a center of the ellipsoidal surface portion centered in the sliding direction of the cam ring sliding surface is equal to an amount of eccentricity between an axis of the plunger and a center of the camshaft.

* * * * *